US006778724B2

(12) United States Patent
Wang et al.

(10) Patent No.: US 6,778,724 B2
(45) Date of Patent: Aug. 17, 2004

(54) OPTICAL SWITCHING AND SORTING OF BIOLOGICAL SAMPLES AND MICROPARTICLES TRANSPORTED IN A MICRO-FLUIDIC DEVICE, INCLUDING INTEGRATED BIO-CHIP DEVICES

(75) Inventors: Mark Wang, San Diego, CA (US); Erhan Polatkon Ata, La Jolla, CA (US); Sadik C. Esener, Solana Beach, CA (US)

(73) Assignee: The Regents of the University of California, Oakland, CA (US)

( * ) Notice: Subject to any disclaimer, the term of this patent is extended or adjusted under 35 U.S.C. 154(b) by 158 days.

(21) Appl. No.: 09/998,012

(22) Filed: Nov. 28, 2001

(65) Prior Publication Data

US 2002/0181837 A1 Dec. 5, 2002

Related U.S. Application Data

(60) Provisional application No. 60/253,644, filed on Nov. 28, 2000.

(51) Int. Cl.[7] .................................................. G02B 6/26

(52) U.S. Cl. .......................... 385/16; 428/188; 422/100

(58) Field of Search ............................... 385/16–24, 27, 385/31, 39, 50; 422/100, 112; 204/601, 451; 428/188, 198, 204, 206

(56) References Cited

U.S. PATENT DOCUMENTS

| | | | |
|---|---|---|---|
| 3,558,877 | A | 1/1971 | Pressman |
| 3,628,182 | A | 12/1971 | Ashkin et al. |
| 3,638,139 | A | 1/1972 | Ashkin et al. |
| 3,662,183 | A | 5/1972 | Ashkin et al. |
| 3,710,279 | A | 1/1973 | Ashkin |
| 3,725,810 | A | 4/1973 | Ashkin et al. |
| 3,761,721 | A | 9/1973 | Altshufer et al. |
| 3,778,612 | A | 12/1973 | Ashkin |

(List continued on next page.)

FOREIGN PATENT DOCUMENTS

| | | | |
|---|---|---|---|
| DE | 4326181 | A1 | 2/1995 |
| EP | 0635994 | B1 | 9/1998 |
| EP | 0556748 | B1 | 10/1998 |
| EP | 0898493 | B1 | 1/2000 |
| JP | 03101419 | A | 4/1991 |
| JP | 05088107 | A | 4/1993 |
| JP | 06123886 | A | 5/1994 |
| JP | 06132000 | A | 5/1994 |
| JP | 06234110 | A | 9/1996 |
| JP | 09043434 | A | 2/1997 |

(List continued on next page.)

OTHER PUBLICATIONS

Li, et al.; Transport, Manipulations, and Reaction of Biological Cells On–Chip Using Electrokinetic Effects; Apr. 15, 1997; Analytical Chemistry, vol. 69, No. 8, pp. 1564–1568.

Mihrimah et al.; Heterogeneous Integration through Electrokinetic Migration; Nov./Dec. 2001; IEEE Engineering in Medicine and Biology; pp. 144–151.

(List continued on next page.)

*Primary Examiner*—Akm Enayet Ullah
(74) *Attorney, Agent, or Firm*—Fish & Richardson P.C.

(57) ABSTRACT

Small particles, for example 5 $\mu$m diameter microspheres or cells, within, and moving with, a fluid, normally water, that is flowing within microfluidic channels within a radiation-transparent substrate, typically molded PDMS clear plastic, are selectively manipulated, normally by being pushed with optical pressure forces, with laser light, preferably as arises from VCSELs operating in Laguerre-Gaussian mode, at branching junctions in the microfluidic channels so as to enter into selected downstream branches, thereby realizing particle switching and sorting, including in parallel. Transport of the small particles thus transpires by microfluidics while manipulation in the manner of optical tweezers arises either from pushing due to optical scattering force, or from pulling due to an attractive optical gradient force. Whether pushed or pulled, the particles within the flowing fluid may be optically sensed, and highly-parallel, low-cost, cell- and particle-analysis devices efficiently realized, including as integrated on bio-chips.

41 Claims, 8 Drawing Sheets

U.S. PATENT DOCUMENTS 3,793,541 A 2/1974 Ashkin et al.
3,808,432 A 4/1974 Ashkin
3,808,550 A 4/1974 Ashkin
4,063,106 A 12/1977 Ashkin et al.
4,092,535 A 5/1978 Ashkin et al.
4,127,329 A 11/1978 Chang et al.
4,247,815 A 1/1981 Larson et al.
4,253,846 A 3/1981 Smythe et al.
4,327,288 A 4/1982 Ashkin et al.
4,386,274 A 5/1983 Altshuler
4,390,403 A 6/1983 Batchelder
4,440,638 A 4/1984 Judy et al.
4,451,412 A 5/1984 Loiseaux et al.
4,453,805 A 6/1984 Ashkin et al.
4,520,484 A 5/1985 Huignard et al.
4,536,657 A 8/1985 Bruel
4,627,689 A 12/1986 Asher
4,632,517 A 12/1986 Asher
4,756,427 A 7/1988 Göhde
4,827,125 A 5/1989 Goldstein
4,886,360 A 12/1989 Finlan
4,887,721 A 12/1989 Martin et al.
4,893,886 A 1/1990 Ashkin
4,908,112 A 3/1990 Pace
5,029,791 A 7/1991 Ceccon et al.
5,079,169 A 1/1992 Chu et al.
5,100,627 A 3/1992 Buican et al.
5,113,286 A 5/1992 Morrison
5,121,400 A 6/1992 Verdiell et al.
5,170,890 A 12/1992 Wilson et al.
5,189,294 A 2/1993 Jackson et al.
5,198,369 A 3/1993 Itoh et al.
5,206,504 A 4/1993 Sridharan
5,212,382 A 5/1993 Sasaki et al.
5,245,466 A 9/1993 Burns et al.
5,274,231 A 12/1993 Chu et al.
5,283,417 A 2/1994 Misawa et al.
5,308,976 A 5/1994 Misawa et al.
5,327,515 A 7/1994 Anderson et al.
5,337,324 A 8/1994 Ohtsu et al.
5,338,930 A 8/1994 Chu et al.
5,343,038 A 8/1994 Nishiwaki et al.
5,355,252 A 10/1994 Haraguichi
5,360,764 A 11/1994 Celotta et al.
5,363,190 A 11/1994 Inaba et al.
5,364,744 A 11/1994 Buican et al.
5,374,566 A 12/1994 Iranmanesh
5,445,011 A 8/1995 Ghislain et al.
5,452,123 A 9/1995 Asher et al.
5,473,471 A 12/1995 Yamagata et al.
5,495,105 A 2/1996 Nishimura et al.
5,512,745 A 4/1996 Finer et al.
5,608,519 A 3/1997 Gourley et al.
5,620,857 A 4/1997 Weetall et al.
5,625,484 A 4/1997 Coutsomitros
5,629,802 A 5/1997 Clark
5,631,141 A 5/1997 Sonek et al.
5,637,458 A 6/1997 Frankel et al.
5,644,588 A 7/1997 Misawa
5,653,859 A 8/1997 Parton et al.
5,659,561 A 8/1997 Torruellas et al.
5,674,743 A 10/1997 Ulmer
5,689,109 A 11/1997 Schutze
5,694,216 A 12/1997 Riza
5,719,467 A 2/1998 Antoniadis et al.
5,760,395 A 6/1998 Johnstone
5,770,856 A 6/1998 Fillard et al.
5,773,298 A 6/1998 Lynggaard et al.
5,776,674 A 7/1998 Ulmer
5,793,485 A 8/1998 Gourley
5,795,457 A 8/1998 Pethig et al.
5,804,436 A 9/1998 Okun et al.
5,814,200 A 9/1998 Pethig et al.
5,858,192 A 1/1999 Becker et al.
5,888,370 A 3/1999 Becker et al.
5,900,160 A 5/1999 Whitesides et al.
5,919,646 A 7/1999 Okun et al.
5,935,507 A 8/1999 Morito et al.
5,939,716 A 8/1999 Neal
5,942,443 A 8/1999 Parce et al.
5,950,071 A 9/1999 Hammond et al.
5,952,651 A 9/1999 Morito et al.
5,953,166 A 9/1999 Shikano et al.
5,956,106 A 9/1999 Petersen et al.
5,993,630 A 11/1999 Becker et al.
5,993,631 A 11/1999 Parton et al.
5,993,632 A 11/1999 Becker et al.
6,015,714 A 1/2000 Baldarelli et al.
6,033,546 A 3/2000 Ramsey
6,055,106 A 4/2000 Grier et al.
6,067,859 A 5/2000 Kas et al.
6,071,394 A 6/2000 Cheng et al.
6,074,725 A * 6/2000 Kennedy .................... 428/188
6,078,681 A 6/2000 Silver
6,082,205 A 7/2000 Zborowski et al.
6,088,097 A 7/2000 Uhl
6,088,376 A 7/2000 O'Brien et al.
6,096,509 A 8/2000 Okun et al.
6,111,398 A 8/2000 Graham
6,121,603 A 9/2000 Hang et al.
6,139,831 A 10/2000 Shivashankar et al.
6,142,025 A 11/2000 Zborowski et al.
6,143,558 A 11/2000 Kopelman et al.
6,149,789 A 11/2000 Benecke et al.
6,159,749 A 12/2000 Liu
6,197,176 B1 3/2001 Pethig et al.
6,208,815 B1 3/2001 Seidel et al.
6,215,134 B1 4/2001 O'Brien et al.
6,221,654 B1 4/2001 Quake et al.
6,224,732 B1 5/2001 Imasaka et al.
6,242,209 B1 6/2001 Ransom et al.
6,280,960 B1 8/2001 Carr
6,280,967 B1 8/2001 Ransom et al.
6,287,758 B1 9/2001 Okun et al.
6,287,776 B1 9/2001 Hefti et al.
6,287,832 B1 9/2001 Becker et al.
6,287,874 B1 9/2001 Hefti
6,294,063 B1 9/2001 Becker et al.
6,344,325 B1 2/2002 Quake et al.
6,399,397 B1 6/2002 Zarling et al.
6,488,895 B1 * 12/2002 Kennedy .................... 422/100
6,509,085 B1 * 1/2003 Kennedy .................... 428/188
6,514,722 B2 2/2003 Palsson et al.
2002/0005354 A1 1/2002 Spence et al.
2002/0045272 A1 4/2002 McDevitt et al.
2002/0058332 A1 5/2002 Quake et al.
2002/0094533 A1 7/2002 Hess et al.
2003/0032204 A1 2/2003 Walt et al.
2003/0047676 A1 3/2003 Grier et al.
JP 10048102 A 2/1998
JP 10062332 A 3/1998
JP 11218691 A 8/1999
WO 05232398 A 9/1993
WO WO 94/08221 A1 4/1994
WO WO 97/21832 A1 6/1997
WO WO 99/61888 2/1999
WO WO 99/39190 A1 8/1999
WO WO 99/61888 A2 12/1999
WO WO 00/23825 A2 4/2000
WO WO 00/45160 A1 8/2000
WO WO 00/45170 A2 8/2000

| | | | |
|---|---|---|---|
| WO | WO 00/45179 | A2 | 8/2000 |
| WO | WO 00/54882 | A1 | 9/2000 |
| WO | WO 01/05514 | A1 | 1/2001 |
| WO | WO 01/09606 | A1 | 2/2001 |
| WO | WO 01/11333 | A2 | 2/2001 |
| WO | WO 01/14870 | A1 | 3/2001 |
| WO | WO 01/20329 | A2 | 3/2001 |
| WO | WO 01/32930 | A1 | 5/2001 |
| WO | WO 01/40454 | A1 | 6/2001 |
| WO | WO 01/40769 | A2 | 6/2001 |
| WO | WO 01/44852 | A2 | 6/2001 |
| WO | WO 01/68110 | A1 | 9/2001 |
| WO | WO 02/22774 | A1 | 3/2002 |

OTHER PUBLICATIONS

Swanson, et al.; A fully multiplexed CMOS biochip for DNA Analysis; 2000; Sensors and Actuators B 64; pp. 22–30.

Zeidler; Automated chromosome analysis; Aug. 1988; Nature, vol. 334, No. 6183; p. 635.

Ackerson et al, "Radiation Pressure As A Technique For Manipulating The Particle Order in Colloidal Suspensions", Faraday Discuss. Chem. Soc., 83, 1987, 309–316.

Afzal et al, "Optical Tweezers Using A Diode Laser", Rev. Sci. Instrum, 63, 4, Apr. 1992, 2157–2163.

Amato, "Optical Matter Emerges Under Laser", Science News, 136, 1989, 212.

Asher et al, "Crystalline Colloidal Bragg Diffraction Devices: The Basis For A New Generation Of Raman Instrumentation", Spectroscopy, 1, 12, 1986, 26–31.

Ashkin , "Acceleration & Trapping Of Particles by Radiation Pressure", Physical Review Letters, 24, 4, Jan. 26, 1970, 158–159.

Ashkin, "Trapping Of Atoms By Resonance Radiation Pressure", Physical Review Letters, 40, 12, Mar. 20, 1978, 729–732.

Ashkin, "Applications Of Laser Radiation Pressure", Science, 210, 4474, Dec. 5, 1980, 1081–1088.

Ashkin, "Forces Of A Single Beam Gradient Laser Trap On A Dielectric Sphere In The Ray Optics Regime", Biophys.J., 61, Feb. 1992, 569–582.

Ashkin et al, "Observation Of A Single Beam Gradient Force Optical Trap For Dielectric Particles", Optics Letters, 11, 5, May 1986, 268–290.

Ashkin et al, "Optical Trapping & Manipulation Of Viruses & Bacteria", Science, 235, 4795, Mar. 20, 1987, 1517–1520.

Ashkin et al, "Optical Trapping & Manipulation Of Single Cells Using Infrared Laser Beams", Nature, 330, 6150, Dec. 24–31, 1987, 769–771.

Ashkin et al, "Force Generation Of Organelle Transport Measured In Vivo By An Infrared Laser Trap", Nature, 348, Nov. 22, 1990, 346–348.

Ashkin et al, "Internal Cell Manipulation Using Infrared Laser Traps", Proc. Natl. Acad. Sci. USA, 66, 20, Oct. 1968, 7914–7918.

Ashkin et al., "Optical Levitation By Radiation Pressure", Appl. Phys.Lett., 19, 8, Oct. 15, 1971, 283–285.

Ashkin, "Optical Trapping & Manipulation Of Neutral Particles Using Lasers", Proc.Natl.Acad.Sci.USA, 94, 10, May 13, 1997, 4853–4860.

Aviva website printout. www.avivabio.com.

Bagnato et al, "Continuous Stopping & Trapping Of Neutral Atoms", Physical Review Letters, 58, 21, May 26, 1987, 2194–2197.

Becker et al, "Separation Of Human Breast Cancer Cells From Blood By Differential Dielectric Affinity", Proc. Natl. Acad. Sci. USA, 92, Jan. 1996, 860–864.

Berns et al, "Use Of A Laser Induced Optical Force Trap To Study Chromosome Movement On the Mitotic Spindle", Proc. Natl. Acad. Sci. USA, 88, 12, Jun. 1989, 4539–4543.

Berns et al, "Laser Microbeam As A Tool In Cell Biology: A Survey Of Cell Biology", *International Review Of Cytology*, 129, 1991, 1–44 (Academic Press; San Diego).

Biegelow et al, "Observation Of Channeling Of Atoms In The Three Dimensional Interference Pattern Of Optical Standing Waves", Physical Review Letters, 65, 1, Jul. 2, 1990, 29–32.

Block et al., "Compliance Of Bacterial Flagella Measurement Without Optical Tweezers", Nature, 338, 6215, Apr. 6, 1989, 614–618.

Block, "Optical Tweezers: A New Tool For Biophysics", *Noninvasive Techniques In Cell Biology*, Chap 16, 1990, 375–402, (Wiley–Liss Inc.: New York).

Bronkhorst et al, "A New Method To Study Shape Recovery Of Red Blood Cells Using Multiple Optical Trapping", Biophys. J., 69, 5, Nov. 1995, 1668–1673.

Buican et al., "Automated Single Cell Manipulation & Sorting By Light Trapping", Applied Optics, 26, 24, Dec. 15, 1987, 5311–5316.

Burns et al, "Optical Binding", Physical Review Letters, 63, 12, Sep. 18, 1989, 1233–1236.

Burns et al., "Optical Matter, Crystallization & Binding In Intense Optical Fields", Science, 249, 4970, Aug. 17, 1990, 749–754.

Business Week, "Is There Anything A Laser Can't Do?", Business Week, Oct. 30, 1989, 157.

Bustamante, "Direct Observation & Manipulation Of Single DNA Molecules Using Fluorescence Microscopy", Annu. Rev. Biophys. Biophys. Chem., 20, 1991, 415–446.

Bustamante et al., "Towards A Molecular Description Of Pulsed Field Gel Electrophoresis", Trends In Biotechnology, 11, 1993, 23–30.

Bustamante et al., "Manipulation Of Single DNA Molecules & Measurement Of Their Persistence, Length & Charge Density Under A Fluorescence Microscope", Abst. Of the 19th Mtg. Of Annual Mtg. Of Amer. Soc. For Photobiology, 53, Jun. 22, 1991, 48S (Pergamon Press: Oxford).

Caldwell, "Field–Flow Fractionation", Analytical Chemistry, 60, 17, Sep. 1, 1988, 959–971.

Chiou et al., "Interferometric Optical Tweezers", Optics Communications, 133, Jan. 1, 1997, 7–10.

Chou et al, "A Microfabricated Device for Sizing & Sorting DNA Molecules", Proc. Natl. Acad. Sci. USA, 96, Jan. 1999, 11–13.

Chowdhury et al., "Laser Induced Freezing", Physical Review Letters, 55, 8, Aug. 19, 1985, 833–836.

Chowdhury et al., "All Optical Logic Gates Using Colloids", Microwave & Optical Technology Letters, 1, 5, Jul. 1988, 175–178.

Chowdhury et al., Exchange of Letters, Science, 252, May 24, 1991.

Chu et al., "Experimental Observation Of Optically Trapped Atoms", Physical Review Letters, 57, 3, Jul. 21, 1988, 314–317.

Clark et al., "Single Colloidal Crystals", Nature, 281, 5728, Sep. 6, 1979, 57–60.

Crocker et al., "Microscopic Measurement Of The Pair Interaction Potential Of Charge Stabilized Colloid", Physical Review Letters, 73, 2, Jul. 11, 1994, 352–355.
Cromie, "Scientists Bind Matter With Light", Harvard University Gazette, Oct. 13, 1989, 1, 4–5.
Davies et al. "Optically Controlled Collisions Of Biological Objects", SPIE, 3260, Jan. 26–28, 1998, 15–22.
Dholakia et al, "Optical Tweezers: The Next Generation", Physics World, Oct. 2002, 31–35.
Dufresne et al, "Optical Tweezer Arrays & Optical Substrates Created With Diffractive Optics", Review Of Scientific Instruments, 69, 5, May 1998, 1974–1977.
Esener, Center For Chips With Heterogeneously Integrated Photonics (CHIPS), DARPA Opto Centers Kickoff, Nov. 8, 2000, Dana Point, CA.
Fallman et al., "Design For Fully Steerable Dual Trap Optical Tweezers", Applied Optics, 36, 10, Apr. 1, 1997, 2107–2113.
Fisher, "The Light That Binds", Popular Science, Jan. 1990, 24–25.
Flynn et al, "Parallel Transport Of Biological Cells Using Individually Addressable VCSEL Arrays As Optical Tweezers", Sensors & Actuators 8, 87, 2002, 239–243.
Fournier et al., "Writing Diffractive Structures By Optical Trapping", SPIE, 2406, Feb. 6–8, 1995, 101–112.
Fu et al. "A Microfabricated Fluorescence Activated Cell Sorter", Nature Biotechnology, 17, Nov. 1999, 1109–1111.
Gascoyne, website, printout, Dec. 1, 2000.
Gorre–Talini et al, "Sorting Of Brownian Particles By The Pulsed Application Of A Asymmetric Potential", Physical Review E, 56, 2, Aug. 1997, 2025–2034.
Grier, "New Age Crystals", Nature, 389, 6653, Oct. 23, 1997, 784–785.
Greulich et al, "The Light Microscope On Its Way From An Analytical To A Preparative Tool", *Journal Of Microscopy*, 167, Pt. 2, Aug. 1, 1992, 127–151.
Gurrieri et al, "Imaging Of Kinked Configurations Of DNA Molecules Undergoing Orthogonal Field Alternating Gel Electrophoresis By Fluorescence Microscope", Biochemistry, 29, 13, Apr. 3, 1990, 3396–3401.
Gurrieri et al, Trapping Of Megabase Sized DNA Molecules During Agarose Gel Electrophoresis, *Proc. Natl. Acad. Sci.* USA, 96, Jan. 1999, 453–458.
Holtz et al, "Polymerized Colloidal Crystal Hydrogel Films As Intelligent Chemical Sensing Materials", Nature, 389, Oct. 23, 1997, 829–832.
Houseal et al, "Imaging Of The Motions & Conformational Transitions Of Single DNA Molecules Using Fluorescence Microscopy", Biophys.J., 55, 324, Feb. 12–16, 1989, 373a.
Houseal et al., "Real Time Imaging Of Single DNA Molecules With Fluorescence Microscopy", Biophys.J., 56, Sep. 1989, 507–516.
Huber et al., "Isolation Of A Hyperthermophilic Archaeum Predicted By in situ RNA Analysis", *Nature*, 376, 8535, Jul. 6, 1995, 57–58.
Imasaka et al., "Optical Chromatography", Analytical Chemistry, 67, 11, Jun. 1, 1995, 1763–1765.
Inside R&D, "Matter Bound By Light", Inside R&D, 18, 43, Oct. 25, 1989, 2.
Kuo et al., "Optical Tweezers In Cell Biology", Trends In Cell Biology, 2, Apr. 1992, 116–118.
Lai, Determination Of Spring Constant Of Laser Trapped Particle By Self–Mining Interferometry, Proc. Of SPIE, 3921, 2000, 197–204.
Law, "Matter Rides On Ripples Of Light", New Scientist, 1691, Nov. 18, 1989, 1691.
Leger et al, "Coherent Laser Addition Using Binary Phase Gratings", Applied Optics, 26, 20, Oct. 15, 1987, 4391–4399.
Mammen et al, "Optically Controlled Collisions Of Biological Objects To Evaluate Potent Polyvalent Inhibitors Of Virus–Cell Adhesion", Chemistry & Biology, 3, 9, Sep. 1996, 757–763.
Mason et al, "Optical Measurements Of Frequency Dependent Linear Viscoelastic Module Of Complex Fluids", Physical Review Letters, 74, 7, Feb. 13, 1995, 1250–1253.
McClelland et al, "Low Frequency Peculiarities Of The Photorefractive Response in Slienitas", Optics Communications, 113, Jan. 1, 1995, 371–377.
Misawa et al, "Spatial Pattern Formation, Size Selection, & Directional Flow Of Polymer Latex Particles By Laser Trapping Technique", Chemistry Letters, 3, Mar. 1991, 469–472.
Misawa et al, "Multibeam Laser Manipulation & Fixation Of Microparticles", Appl.Phys.Lett., 60, 3, Jan. 20, 1992, 310–312.
Mitchell et al, "A Practical Optical Trap For Manipulating & Isolating Bacterial from Complex Microbial Communities", Micro Ecol., 25, 2, 1993, 113–119.
Murray et al, "Experimental Observation Of Two Stage Melting In A Classical Two Dimensional Screened Coulomb System", Physical Review Letters, 58, 12, Mar. 23, 1987, 1200–1203.
Murray et al, "Colloidal Crystals", American Scientist, 83, 3, May–Jun. 1996, 238–245.
Mycometrix, website printout, www.mycometrix.com, Dec. 1, 2000.
New York Times, "Atoms Bound Together By Light", New York Times, Oct. 31, 1989, C17.
Paterson et al, "Controlled Rotation Of Optically Trapped Microscopic Particles", Science, 292, May 4, 2001, 912–914.
Pritchard et al, "Light Traps Using Spontaneous Forces", Physical Review Letters, 57, 3, Jul. 21, 1986, 310–313.
Quake et al, "From Micro– to Nanofabrication With Soft Materials", Science, 290, Nov. 24, 2000, 1536–1540.
Raab et al, "Trapping Of Neutral Sodium Atoms With Radiation Pressure", Physical Review Letters, 59, 23, Dec. 7, 1987, 2631–2634.
Rogovin et al, "Bifurcation In Degenerate Four–Wave Mixing In Liquid Suspensions Of Microspheres", Physical Review Letters, 54, 20, May 20, 1985, 2222–2225.
Roosen, "A Theoretical & Experimental Study Of The Stable Equilibrium Positions Of Spheres Levitated By Two Horizontal Laser Beams", Optics Communications, 21, 1, Apr. 1977, 189–194.
Sasaki et al, "Laser Scanning Micromanipulation & Spatial Patterning Of Fine Particles", Japanese Journal Of Applied Physics, 31, 58, May 1991, L907–L909.
Sasaki et al, "Pattern Formation & Flow Control Of Fine Particles By Laser Scanning Micromanipulation", Optics Letters, 16, 19, Oct. 1, 1991, 1463–1465.
Sasaki et al., "Optical Micromanipulation Of A Lasing Polymer Particle In Water", Japanese Journal Of Applied Physics, Pt. 2, 32, 6B, Aug. 15, 1993, L1144–L1147.
Sasaki et al, "Optical Trapping Of A Metal Particle & A Water Droplet By A Scanning Laser Beam", Appl. Phys. Lett., 60, 7, Feb. 17, 1992, 807–809.

Shikano et al, "Separation Of A Single Cell By Red–Laser Manipulation", Applied Physics Letters, 75, 17, Oct. 25, 1999, 2871–2873.

Smith et al, "Four Wave Mixing In An Artificial Kerr Medium", Optics Letters, 6, 5, Jun. 1981, 284–285.

Smith et al, "Direct Mechanical Measurements Of The Elasticity Of Single DNA Molecules By Using Magnetic Beads", Science, 258, 5065, Nov. 13, 1992, 1122–1128.

Smith et al, "Model & Computer Simulations Of The Motion Of DNA Molecules During Pulsed Field Gel Electrophoresis", Biochemistry, 30, 21, May 28, 1991, 5264–5274.

Sonek et al, "Micromanipulation & Physical Monitoring Of Cells Using Two–Photon Excited Fluorescence in CW Laser Tweezers", SPIE, 2678, Jan. 28–Feb. 1, 1996, 62–68.

Suzuki et al, "Hysteric Behavior & Irreversibility Of Polymer Gels By pH Change", J. Chem. Phys., 103, 11, Sep. 15, 1995, 4706–4710.

Suzuki et al., "Optical Switching In Polymer Gels", J. Appl. Phys., 80, 1, Jul. 1, 1998, 131–136.

Svoboda et al, "Biological Applications In Optical Forces", Annu .Rev. Biophys. Biomol. Struct. 23, 1994, 247–286.

Svoboda et al, Conformation & Elasticity Of The Isolated Red Blood Cell Membrane Skeleton, Biophys. J., 83, 3, Sep. 1, 1992, 784–793.

Swanson et al, "Diffractive Optical Elements For Use In Infrared Systems", Optical Engineering, 2B, 6, Jun. 1989, 605–608.

Takashima et al., "Dielectric Dispersion Of DNA", J. Mol. Biol., 7, 5, Nov. 1963, 455–467.

Thirunamachandran, "Intramolecular Interactions in The Presence of An Intense Radiation Field", Molecular Physics, 40, 2, 1980, 393–399.

Unger et al, "Monolithic Microfabricated Valves & Pumps By Multilayer Soft Lithography", Science, 286, Apr. 7, 2000, 113–116.

VanBlaaderen et al, "Template Directed Colloidal Crystallization", Nature, 385, 6614, Jan. 23, 1997, 321–324.

Visscher et al, "Construction Of Multiple Beam Optical Traps With Nanometer Resolution Position Screening", IEEE Jnl Of Selected Topics in Quantum Electronics, 2, 4, Dec. 1996, 1066–1075.

Wang et al, "All Optical Switching Of Biological Samples In A Microfluidic Device", International Phonics Conference 2000, Dec. 12–15, 2000, Hsinchu, Taiwan.

Wang et al, "Integration Of Optoelectronic Array Devices For Cell Transport & Sorting", Photonics West 2001, Jan. 20–26, 2001, San Jose, CA.

Weber et al, "Manipulation Of Cells, Organeles & Genomes By Laser Microbeam & Optical Trap", Intl. Rev. Of Cytology, 133, 1992, 1–41, (Academic Press: San Diego).

Wei et al, Laser Trapping Microscopy As A Diagnostic Technique For The Study Of Cellular Response & Laser–Cell Interactions, SPIE, 2983, Feb. 10–11, 1997, 22–28.

Westbrook et al, "Localization Of Atoms In A Three Dimensional Standing Wave", Physical Review Letters, 65, 1, Jul. 2, 1990, 33–38.

Wheeler, "Force Fields Of Laser Light Bind Molecules In A Remarkable Discovery At Harvard", The Chronicle Of Higher Education, Oct. 25, 1989, A4.

Wright et al, "Radiation Trapping Forces On Microspheres With Optical Tweezers", Appl. Phys. Lett., 63, 6, Aug. 9, 1893, 715–717.

Wuite et al, "An Integrated Laser Trap/Flow Control Video Microscope For The Study Of Single Biomolecules", Biophys. Jnl., 79, 2, Aug. 2000, 1155–1167.

Xiang et al, "A Combinatorial Approach To Materials Discovery", Science, 268, 5218, Jun. 23, 1996, 1736–1740.

Yablonovitch, "Inhibited Spontaneous Emission In Solid State Physics & Electronics", Physical Review Letters, 58, 20, May 18, 1967, 2059–2062.

Yablonovitch et al, "Photonic Band Structure: The Face Centered Cubic Face", Physical Review Letters, 63, 16, Oct. 30, 1999, 1950–1953.

Yuqiu, "Mechanical, Electrical, & Chemical Manipulation Of Single DNA Molecules", Nanotechnology, 3, 1992, 16–20.

Zahn et al, "Fluorimetric Multiparameter Cell Assay At The Single Cell Level Fabricated By Optical Tweezers", FEBS Letters, 443, 1999, 337–340.

* cited by examiner

Hermite-Gaussian mode VCSEL:

Laguerre-Gaussian mode VCSEL:

OPTICAL SWITCHING AND SORTING OF BIOLOGICAL SAMPLES AND MICROPARTICLES TRANSPORTED IN A MICRO-FLUIDIC DEVICE, INCLUDING INTEGRATED BIO-CHIP DEVICES

RELATION TO A PROVISIONAL PATENT APPLICATION

The present patent application is descended from, and claims benefit of priority of, U.S. provisional patent application Serial No. 60/253,644 filed on Nov. 28, 2000, having the same title, and to the selfsame inventors, as the present utility patent application.

BACKGROUND OF THE INVENTION

1. Field of the Invention

The present invention generally concerns optical tweezers, microfluidics, flow cytometry, biological Micro Optical Electro Mechanical Systems (Bio-MOEMS), Laguerre-Gaussian mode emissions from Vertical Cavity Surface Emitting Lasers (VCSELs), cell cytometry and microfluidic switches and switching.

The present invention particularly concerns the sorting of microparticles in fluid, thus a "microfluidic sorting device"; and also the directed movement, particularly for purposes of switching, of microparticles based on the transference of momentum from photons impinging on the microparticles, ergo "photonic momentum transfer".

2. Description of the Prior Art 2.1 Background to the Functionality of the Present Invention In the last several years much attention has been paid to the potential for lab-on-a-chip devices to significantly enhance the speed of biological and medical research and discovery. See P. Swanson, R. Gelbart, E. Atlas. L. Yang, T. Grogan, W. F. Butler, D. E. Ackley, and C. Sheldon. "A fully multiplexed CMOS biochip for DNA analysis," Sensors and Actuators B 64, 22–30 (2000). See also M. Ozkan, C. S. Ozkan, M. M. Wang, O. Kibar, S. Bhatia, and S. C. Esener, "Heterogeneous Integration of Biological Species and Inorganic Objects by Electrokinetic Movement," IEEE Engineering in Medicine and Biology, in press.

The advantages of such bio-chips that have been demonstrated so far include the abilities to operate with extremely small sample volumes (on the order of nanoliters) and to perform analyses at much higher rates than can be achieved by traditional methods. Devices for study of objects as small as DNA molecules to as large as living cells have been demonstrated. See P. C. H. Li and D J, Harrison, Transport, Manipulation, and Reaction of Biological Cells On-Chip Using Electrokinetic Effects," Anal. Chem. 69, 1564–1569 (1997).

One important capability for cell research is the ability to perform cell sorting, or cytometry, based on the type, size, or function of a cell. Recent approaches to micro-cytometry have been based on electrophoretic or electro-osmotic separation of different cell types. See A. Y. Fu, C. Spence, A. Scherer, F. H. Arnold, and S. R Quake, "A microfabricated fluorescence-activated cell sorter," Nature 17.1109–1111 (1999).

2.2 Scientific Background to the Structure of the Device of the Present Invention The present invention will be seen to employ optical tweezers. See A. Ashkin, J. M. Dziedzic, J. E. Bjorkholm, and S. Chu, "Observation of a single-beam gradient force optical trap for dielectric particles;" Opt. Lett. 11, 288–291) (1986).

The present invention will also be seen to employ microfabricated fluidic channels. See H. -P. Chou, C. Spence. A. Scherer. and S. Quake, "A microfabricated device for sizing and sorting DNA molecules," Proc. Natl. Acad. Sci. USA 96 11–13 (1999).

In previous demonstrations of the optical manipulation of objects through defined fluidic channels, photonic pressure was used to transport cells over the length of the channels. See T. N. Buican M. J. Smyth, H. A. Crissman, G. C. Salzman, C. C. Stewart, and J. C. Martin, "Automated single-cell manipulation and sorting by light trapping." Appl. Opt, 26, 3311–5316 (1987). The device of the present invention will be seen to function oppositely.

2.3 Engineering, and Patent, Background to the Structure of the Device of the Present Invention There are many existing (i) bio-chip (lab-on-a-chip) technologies, and (ii) microfluidic technologies. Most of these technologies use electrical or mechanical force to perform switching within the channels. The present invention is unique in that optics (as generate photonic pressure, or radiation pressure) is used to perform switching—particularly of small particles flowing in microfluidic channels.

2.3.1 Background Patents Generally Concerning Optical Tweezing and Optical Particle Manipulation The concept of using photonic pressure to move small particles is known. The following patents, all to Ashkin, generally deal with Optical Tweezers. They all describe the use of optical "pushing" and optical "trapping" forces, both of which are used in the present invention. These patents do not, however, teach or suggest such use of optical forces in combination with microfluidics as will be seen to be the essence of the present invention.

U.S. Pat. No. 3,710,279 to Askin, assigned to Bell Telephone Laboratories, Inc. (Murray Hill, N.J.), for APPARATUSES FOR TRAPPING AND ACCELERATING NEUTRAL PARTICLES concerns a variety apparatus for controlling by radiation pressure the motion of particle, such as a neutral biological particle, free to move with respect to its environment. A subsequent Askin patent resulting from a continuation-in-part application is U.S. Pat. No. 3,808,550.

Finally, U.S. Pat. No. 4,893,886 again to Ashkin, et al., assigned to American Telephone and Telegraph Company (New York, N.Y.) and AT&T Bell Laboratories (Murray Hill, N.J.), for a NON-DESTRUCTIVE OPTICAL TRAP FOR BIOLOGICAL PARTICLES AND METHOD OF DOING SAME, concerns biological particles successfully trapped in a single-beam gradient force trap by use of an infrared laser. The high numerical aperture lens objective in the trap is also used for simultaneous viewing. Several modes of trapping operation are presented.

2.3.2 Patents Showing Various Conjunctions of Optical Tweezing/Optical Manipulation and Microfluidics/Microchannels U.S. Pat. No. 4,887,721 to Martin, et al., assigned to Bell Telephone Laboratories, Inc. (Murray Hill, N.J.), for a LASER PARTICLE SORTER, concerns a method and apparatus for sorting particles, such as biological particles. A first laser defines an optical path having an intensity gradient which is effective to propel the particles along the path but which is sufficiently weak that the particles are not trapped in an axial direction. A probe laser beam interrogates the particles to identify predetermined phenotypical characteristics of the particles. A second laser beam intersects the driving first laser beam, wherein the second laser beam is activated by an output signal indicative of a predetermined characteristic. The second laser beam is switchable between a first intensity and a second intensity, where the first intensity is effective to displace selected particles from the driving laser beam and the second intensity is effective to propel selected particles along the deflection laser beam. The selected particles may then be propelled by the deflection beam to a location effective for further analysis.

The described particle propulsion means of Martin, et al. concerns (i) the suspension of particles by fluidics and (ii) the use of an optical pushing beam to move particles around in a cavity. The application of sorting—as is performed by certain apparatus of the present invention—is also described. However, the present invention is distinguished over U.S. Pat. No. 4,887,721 for SORTING IN MICROFLUIDICS to Martin, et al. because this patent teaches the use of optical beams to do all particle transport, while the present invention uses optical beams only for switching, with transport accomplished by microfluidic flow. In the apparatus of U.S. Pat. No. 4,887,721 a single beam pushes a particle along from one chamber to the next. It will soon be seen that in the various apparatus of the present invention continuous water flow serves to move the particles around, and optics is only used as the switch. This is a much more efficient use of photons and makes for a faster throughput device.

The Martin, et al. patent also describes (i) sensing particles by optical means, and (ii) act on the results of the sensing so as to (iii) manipulate the particles with laser light. Such optical sensing is fully compatible with the present invention.

Also involving both (i) fluidics and, separately, (ii) optical manipulation is U.S. Pat. No. 5,674,743 to Ulmer, assigned to SEQ, Ltd. (Princeton, N.J.), for METHODS AND APPARATUS FOR DNA SEQUENCING. The Ulmer patent concerns a method and apparatus for automated DNA sequencing. The method of the invention includes the steps of: a) using a processive exonuclease to cleave from a single DNA strand the next available single nucleotide on the strand; b) transporting the single nucleotide away from the DNA strand; c) incorporating the single nucleotide in a fluorescence-enhancing matrix; d) irradiating the single nucleotide to cause it to fluoresce; e) detecting the fluorescence; f) identifying the single nucleotide by its fluorescence; and g) repeating steps a) to f) indefinitely (e.g., until the DNA strand is fully cleaved or until a desired length of the DNA is sequenced). The apparatus of the invention includes a cleaving station for the extraction of DNA from cells and the separation of single nucleotides from the DNA; a transport system to separate the single nucleotide from the DNA and incorporate the single nucleotide in a fluorescence-enhancing matrix; and a detection station for the irradiation, detection and identification of the single nucleotides. The nucleotides are advantageously detected by irradiating the nucleotides with a laser to stimulate their natural fluorescence, detecting the fluorescence spectrum and matching the detected spectrum with that previously recorded for the four nucleotides in order to identify the specific nucleotide.

In one embodiment of the Ulmer apparatus an electric field applied (about 0.1–10 V/cm) via suitably incorporated electrodes to induce the chromosomes to migrate into a microchannel single-file, much as is done in an initial step of cell sorting. The individual chromosomes are visualized by the microscope system as they proceed along the microchannel. This step can also be automated by using computer image analysis for the identification of chromosomes (see Zeidler, 1988, Nature 334:635). Bifurcations in the channel are similarly used in conjunction with selectively applied electric fields to divert the individual chromosomes into small isolation chambers. Once individual chromosomes have been isolated, the sister chromatids are separated by either a focused laser microbeam and optical tweezers, or mechanical microdissection to provide two "identical" copies for sequencing.

The present invention will be seen to use optical tweezers not only on chromosomes and the like once delivered to "chambers" by use of microchannels, but also to divert the particles within the microchannels themselves—a process that Ulmer contemplates to do only by electric fields.

U.S. Pat. No. 5,495,105 to Nishimura, et al. for a METHOD AND APPARATUS FOR PARTICLE MANIPULATION, AND MEASURING APPARATUS UTILIZING THE SAME concerns a flow of liquid containing floating fine particles formed in a flow path, thereby causing successive movement of the particles. A light beam having intensity distribution from a laser is focused on the liquid flow, whereby the particle is optically trapped at the irradiating position, thus being stopped against the liquid flow or being slowed by a braking force. This phenomenon is utilized in controlling the spacing of the particles in the flow or in separating the particles.

The present invention will be seen not to be concerned with retarding (breaking) or trapping the flow of particles in a fluid, but rather in changing the path(s) of particle flow.

The next three patents discussed are not necessarily prior art to the present invention because they have issuance dates that are later than one year prior to the priority date of the present patent application as this priority date is established by the predecessor provisional patent application, referenced above. However, these patents are mentioned for completeness in describing the general current, circa 21001, state of the art in microfluidic and/or laser manipulative particle processing, and so that the distinction of the present invention over existing alternative techniques may be better understood.

In this regard, U.S. Pat. No. 6,139,831 to Shivashankar, et al., assigned to The Rockfeller University (New York, N.Y.), for an APPARATUS AND METHOD FOR IMMOBILIZING MOLECULES ONTO A SUBSTRATE, contemplates both (i) movement by microfluidics and (ii) manipulation by optical tweezers. However, Shivashankar, et al. contemplate that these should be separate events.

The Shivashankar, et al., patent concerns an apparatus and method for immobilizing molecules, particularly biomolecules such as DNA, RNA, proteins, lipids, carbohydrates, or hormones onto a substrate such as glass or silica. Patterns of immobilization can be made resulting in addressable, discrete arrays of molecules on a substrate, having applications in bioelectronics, DNA hybridization assays, drug assays, etc. The Shivashankar, et al., invention reportedly readily permits grafting arrays of genomic DNA and proteins for real-time process monitoring based on DNA-DNA, DNA-protein or receptor-ligand interactions. In the apparatus an optical tweezer is usable as a non-invasive tool, permitting a particle coated with a molecule, such as a bio-molecule, to be selected and grafted onto spatially localized positions of a semiconductor substrate. It is recognized that this non-invasive optical method, in addition to biochip fabrication, has applications in grafting arrays of specific biomolecules within microfluidic chambers, and it is forecast by Shivashankar, et al., that optical separation methods may work for molecules as well as cells.

Well they may; however the present invention will be seen, inter alia, to employ optical tweezers on biomolecules while moving these molecules move in microchannels under microfluidic forces—as opposed to being stationary in microfluidic chambers.

U.S. Pat. No. 6,159,749 to Liu, assigned to Beckman Coulter, Inc. (Fullerton, Calif.), for a HIGHLY SENSITIVE BEAD-BASED MULTI-ANALYTE ASSAY SYSTEM USING OPTICAL TWEEZERS concerns an apparatus and method for chemical and biological analysis, the apparatus having an optical trapping means to manipulate the reaction substrate, and a measurement means. The optical trapping means is essentially a laser source capable of emitting a beam of suitable wavelength (e.g., Nd:YAG laser). The laser beam impinges upon a dielectric microparticle (e.g., a 5 micron polystyrene bead which serves as a reaction substrate), and the bead is thus confined at the focus of the laser beam by a radial component of the gradient force. Once "trapped," the bead can be moved, either by moving the beam focus, or by moving the reaction chamber. In this manner, the bead can be transferred among separate reaction wells connected by microchannels to permit reactions with the reagent affixed to the bead, and the reagents contained in the individual wells.

The patent of Liu thus describes the act of moving particles—beads—in microchannels under force of optical laser beams, or traps. However, as with the other references, Liu does not contemplate that particles moving under force of microfluidics should also be subject to optical forces.

U.S. Pat. No. 6,294,063 to Becker, et al., assigned to the Board of Regents, The University of Texas System (Austin, Tex.), for a METHOD AND APPARATUS FOR PROGRAMMABLE FLUIDIC PROCESSING concerns a method and apparatus for microfluidic processing by programmably manipulating a packet. A material is introduced onto a reaction surface and compartmentalized to form a packet. A position of the packet is sensed with a position sensor. A programmable manipulation force is applied to the packet at the position. The programmable manipulation force is adjustable according to packet position by a controller. The packet is programmably moved according to the programmable manipulation force along arbitrarily chosen paths.

It is contemplated that the "packets" may be moved along the "paths" by many different types of forces including optical forces. The forces are described to be any of dielectrophoretic, electrophoretic, optical (as may arise, for example, through the use of optical tweezers), mechanical (as may arise, for example, from elastic traveling waves or from acoustic waves), or any other suitable type of force (or combination thereof). Then, in at least some embodiments, these forces are programmable. Using such programmable forces, packets may be manipulated along arbitrarily chosen paths.

As with the other described patents, the method and apparatus of Becker, et al., does not contemplate moving with one force—microfluidics—while manipulating with another force—an optical force.

SUMMARY OF THE INVENTION

In one of its several aspects the present invention contemplates the use of optical beams (as generate photonic pressure, or radiation pressure) to perform switching of small particles that are flowing in microfluidic channels. The invention is particularly beneficial of use in bio-chip technologies where one wishes to both transport and sort cells (or other biological samples).

In its microfluidic switching aspect, the present invention contemplates the optical, or radiation, manipulation of microparticles within a continuous fluid, normally water, flowing through small, microfluidic, channels. The water flow may be induced by electro-osmosis, pressure, pumping, or whatever. A particle within a flowing fluid passes into a junction that is typically in the shape of an inverted "T" or "Y", or an "X", or, more generally, any branching of n input channels where n=1, 2, 3, . . . N, to M output channels where m=1, 2, 3, . . . M. Photonic forces serve to controllably direct a particle appearing at the junction from one of the n input channels into (i.e., "down to") one of the m output channels. The photonic forces may be in the nature of pulling forces, or, more preferably, photonic pressure forces, or both pulling and pushing forces to controllably force the particle in the desired direction and into the desired output channel. Two or more lasers may be directionally opposed so that a particle appearing at one of the n input channels may be pushed (or pulled) in either direction to one of the m output channels.

The size range of the microfuidic channels is preferably from 2 μm to 200 μm in diameter, respectively switching and sorting microparticles, including living cells, in a size range from 1 μm to 100 μm in diameter.

This microfluidic switching aspect of the present invention has two major embodiments, which embodiments are more completely expounded in the DESCRIPTION OF THE PREFERRED EMBODIMENT of this specification as section 1 entitled "All-Optical Switching of Biological Samples in a Microfluidic Device", and as section 2 entitled "Integration of Optoelectronic Array Devices for Cell Transport and Sorting. Furthermore, the "optoelectronic array devices" of the second embodiment are most preferably implemented as the VCSEL tweezers, and these tweezers are more completely expounded in the section 3 entitled "VCSEL Optical Tweezers, Including as Are Implemented as Arrays".

In a first embodiment of the microfluidic switching (expounded in section 1.) an optical tweezer trap is used to trap a particle as it enters the junction and to "PULL" it to one side or the other. In a second embodiment of the microfluidic switching (expounded in section 2.), the scattering force of an optical beam is used to "PUSH" a particle towards one output or the other. Both embodiments have been reduced to operative practice, and the choice of which embodiment to use, or to use both embodiments simultaneously, is a function of exactly what is being attempted to be maneuvered, and where. The "PUSH" solution—which can, and preferably is, also based on a VCSEL, or VCSEL array—is generally more flexible and less expensive, but produces less strong forces, than the "PULL" embodiment.

The particle passes through the optical beam only briefly, and then continues down a selected channel continuously following the fluid. Microfluidic particle switches in accordance with the present invention can be made both (i) parallel and (ii) cascadable—which is a great advantage. A specific advantage of using optics for switching is that there is no physical contact with the particle, therefore concerns of cross-contamination are reduced.

Still another attribute of the invention is found within both specific embodiments where the optical switching beam preferably enters the switching region of a microfluidic chip orthogonally to the flat face of the chip. This means that the several microfluidic channels at the junction are at varying depths, or levels, in the chip, and the switching beams serve to force a particle transversely to the flat face of the chip—"up" or "down" within the chip—to realize switching. Each optical beam is typically focused in a microfluidic junction by an external lens. This is very convenient, and eases optical design considerably. However, it will also be understood that optical beams could alternatively be entered by wave guides and/or microlenses fabricated directly within the microfluidic chip.

In another of its aspects, the present invention contemplates a new form of optical tweezer that is implemented from both (i) a Vertical Cavity Surface Emitting Laser (VCSEL) (or tweezer arrays that are implemented from arrayed VCSELs) and (ii) a VCSEL-light-transparent substrate in which are present microfluidic channels flowing fluid containing microparticles. The relatively low output power, and consequent relatively low optical trapping strength of a VCSEL, is in particular compensated for in the "microfluidic optical tweezers" of the present invention by changing the lasing, and laser light emission, mode of the VCSEL from Hermite-Gaussian to Laguerre Gaussian. This change is realized in accordance with the VCSEL post-fabrication annealing process taught within the related U.S. patent application, the contents of which are incorporated herein by reference.

The preferred VCSELs so annealed and so converted from a Hermite-Gaussian to a Laguerre-Gaussian emission mode emit light that is characterized by rotational symmetry and, in higher modal orders, close resembles the so-called "donut" mode. Light of this characteristic is optimal for tweezing; the "tweezed" object is held within the center of a single laser beam. Meanwhile the ability to construct and to control arrayed VCSELs at low cost presents new opportunities for the sequenced control of tweezing and, in accordance with the present invention, the controlled transport and switching of microparticles traveling within microfluidic channels.

1. Moving and Manipulating Small Particles, Including for Switching and Sorting

Accordingly, in one of its aspects the present invention is embodied in a method of moving, and also manipulating, small particles, including for purposes of switching and sorting.

The method of both physically (i) moving and (ii) manipulating a small particle consists of (i) placing the particle in fluid flowing in a microfluidic channel; and (ii) manipulating the particle under force of radiation as it moves in the microfluidic channel.

The method may be extended and adapted to physically spatially switching the small particle to a selected one of plural alternative destination locations. In such case the placing of the particle in fluid flowing in a microfluidic channel consists of suspending the particle in fluid flowing in a compound microfluidic channel from (i) an upstream location through (ii) a junction branching to (iii) each of plural alternative downstream destination locations. The manipulating of the particle under force of radiation as it moves in the compound microfluidic channel then consists of controlling the particle at the branching junction to move under force of radiation into a selected path leading to a selected one of the plural alternative downstream destination locations.

The controlling is preferably with a single radiation beam, the particle being suspended within the flowing fluid passing straight through the junction into a path leading to a first downstream destination location in absence of the radiation beam. However, in the presence of the radiation beam the particle deflects into an alternative, second, downstream destination location.

The controlling may alternatively be with a selected one of two radiation beams impinging on the junction from different directions. The particle suspended within the flowing fluid deflects in one direction under radiation force of one radiation beam into a first path leading to a first downstream destination location. Alternatively, the particle deflects under radiation force of the other, different direction, radiation beam into a second path leading to a second downstream destination location.

In the case of generalized switching where a particle from any of n input paths is switched to any of m output paths, the particle will enter the junction from any number of n input paths that are normally spaced parallel, and will be deflected to a varying distance in either directions so as to enter a selected one of the m output paths. The particular radiation (laser) source that is energized, and the duration of the energization, will influence how far, and in what direction, the particle moves. Clearly forcing a particle to move a long distance, as when n or m or both are large numbers >4, entails (i) longer particle transit times with (ii) increasing error. Since particles can be sorted into large numbers (m>>4) of destinations in a cascade of microfluidic switches, no single switch is normally made excessively "wide".

The controlling is preferably with a laser beam, and more preferably with a Vertical Cavity Surface Emitting (VCSEL) laser beam, and still more preferably with a VCSEL laser beam having Laguerre-Gaussian spatial energy distribution.

2. A Mechanism for Moving and Manipulating Small Particles, Including for Switching and Sorting In another of its aspects the present invention is embodied in a mechanism for moving, and also manipulating, small particles, including for purposes of switching and sorting.

The preferred small particle moving and manipulating mechanism includes (i) a substrate in which is present at least one microfluidic channel, the substrate being radiation transparent at at least one region along the microfluidic channel; (ii) a flow inducer inducing a flow of fluid bearing small particles in the microfluidic channel; and (iii) at least one radiation beam selectively enabled to pass through at least one radiation-transparent region of the substrate and into the microfluidic channel so as to there produce a manipulating radiation force on the small particles as they flow by.

This small particles moving and manipulating mechanism according can be configured and adapted as a switching mechanism for sorting the small particles. In such case the substrate's at least one microfluidic channel branches at the at least one junction. Meanwhile the flow inducer is inducing the flow of fluid bearing small particles in the at least one microfluidic channel including through the channel's at least one junction and into all the channel's branches. Still further meanwhile, the at least one radiation beam selectively passes through the radiation-transparent region of substrate and into a junction of the microfluidic channel so as to there selectively produce a radiation force on each small particle at such time as the particle should pass through the junction, which selective force will cause each small particle to enter into an associated desired one of the channel's branches. By this coaction the small particles are controllably sorted into the channel branches.

In one variant embodiment, the substrate of the switch mechanism has plural levels differing in distance of separation from a major surface of the substrate The at least one microfluidic channel branches at the at least one junction between (i) at least one, first, path continuing on the same level and (ii) another, alternative second, path continuing on a different level. In operation one only radiation beam selectively acts on a small particle at the junction so as to (i) produce when ON a radiation force on the small particle at the junction that will cause the small particle to flow into the alternative second path. However, when this one radiation beam is OFF, the small particle will continue flowing upon the same level and into the first path.

3. A Small Particle Switch

In yet another of its aspects the present invention may simply be considered to be embodied in a small particle switch, or, more precisely, a switch mechanism for controllably spatially moving and switching a small particle arising from a particle source into a selected one of a plurality of particle sinks.

The switch includes a radiation-transparent microfluidic device defining a branched microfluidic channel, in which channel fluid containing a small particle can flow, proceeding from (i) particle source to (ii) a junction where the channel then branches into (iii) a plurality of paths respectively leading to the plurality of particle sinks. The switch also includes a flow inducer for inducing a flow of fluid, suitable to contain the small particle, in the microfluidic channel from the particle source through the junction to all the plurality of particle sinks. Finally, the switch includes at least one radiation beam selectively enabled to pass through the radiation-transparent microfluidic device and into the junction so as to there produce a radiation force on a small particle as it passes through the junction within the flow of fluid, therein by this selectively enabled and produced radiation force selectively directing the small particle that is within the fluid flow into a selected one of the plurality of paths, and to a selected one of the plurality of particle sinks.

In operation of the switch the small particle is physically transported in the microfluidic channel from the particle source to that particular particle sink where it ultimately goes by action of the flow of fluid within the microfluidic channel. The small particle is physically switched to a selected one of the plurality of microfluidic channel paths, and to a selected one of the plurality of particle sinks, by action of radiation force from the radiation beam.

The branched microfluidic channel of the radiation-transparent microfluidic device is typically bifurcated at the junction into two paths respectively leading to two particle sinks. The flow inducer thus induces the flow of fluid suitable to contain the small particle from the particle source through the junction to both particle sinks, while the at least one radiation beam is selectively enabled to produce a radiation force on a small particle as it passes through the junction within the flow of fluid so as to selectively direct the small particle into a selected one of the two paths, and to a selected one of the two particle sinks.

It is possible to use two radiation beams are selectively enabled to produce a radiation force on a small particle as it passes through the junction within the flow of fluid so as to selectively direct the small particle into a selected one of the two paths, and to a selected one of the two particle sinks, one of the two radiation beams being enabled to push the particle into one of the two paths and the other of the two radiation beams being enabled to push the particle into the other one of the two paths.

The preferred bifurcated junction splits into two paths one of which paths proceeds straight ahead and another of which paths veers away, the two paths respectively leading to two particle sinks. In this case preferably one radiation beam is selectively enabled to produce a radiation force on a small particle as it passes through the junction within the flow of fluid so as to push when enabled the small particle into the path that veers away, and so as to permit when not enabled that the particle will proceed in the path straight ahead.

When the bifurcated microfluidic channel of the radiation-transparent microfluidic device defines a geometric plane, then the one radiation beam is preferably substantially in the geometric plane at the junction.

4. Optical Tweezers

In still yet another of its aspects the present invention may simply be considered to be embodied in a new form of optical tweezers.

The optical tweezers have a body defining a microfluidic channel in which fluid transporting small particles flows, the body being transparent to radiation at at least some region of the microfluidic channel. A radiation source selectively acts, through the body at a radiation-transparent region thereof, on the transported small particles within the microfluidic channels. By this action the small particles (i) are transported by the fluid to a point of manipulation by the radiation source, and (ii) are there manipulated by the radiation source.

The radiation source preferably consists of one or more Vertical Cavity Surface Emitting Lasers (VCSELs), which may be arrayed in one, or in two dimensions as the number, and positions, of manipulating locations dictates.

The VCSEL radiation sources are preferably conditioned so as to emit laser light in the Laguerre-Gaussian mode, with a Laguerre-Gaussian spatial intensity distribution.

The one or more VCSELs are preferably disposed orthogonally to a surface, normally a major surface, of the body, normally a planar substrate, in which is present the microfluidic channel, laser light from at least one VCSEL, and normally all VCSELs, impinging substantially orthogonally on both the body and its microfluidic channel.

The microfluidic channel normally has a junction where an upstream, input, fluidic pathway bifurcates into at least two alternative, downstream, fluidic pathways. The presence or absence of the radiation at this junction then determines whether a particle contained within fluid flowing from the upstream fluidic pathway through the junction is induced to enter a one, or another, of the two alternative, downstream, fluidic pathways.

The two alternative, downstream, fluidic pathways of the microfluidic channel may be, and preferably are, separated in a "Z" axis direction orthogonal to the plane of the substrate. The presence or absence of the laser light from the VCSEL at the junction thus selectively forces the particle in a "Z" axis direction, orthogonal to the plane of the substrate, in order to determine which one of the two alternative, downstream, fluidic pathways the particle will enter.

However, the two alternative, downstream, fluidic pathways of the microfluidic channel may be separated in different directions in the plane of the substrate, the at least two alternative downstream, fluidic pathways then being of the topology of the arms of an inverted capital letter "Y", or, topologically equivalently, of the two opposing crossbar segments of an inverted capital letter "T". The presence or absence of the laser light from the VCSEL at the junction then selectively forces the particle to deviate in direction of motion in the plane of the substrate, therein to determine which branch one of the two alternative, downstream, fluidic pathways the particle will enter.

5. An Optical Tweezing Method

In still yet another of its aspects the present invention may simply be considered to be embodied in a new method of optically tweezing a small particle.

The method consists of transporting the small particle in fluid flowing within a microfluidic channel, and then manipulating the small particle with laser light as it is transported by the flowing fluid within the channel.

The manipulating laser light is preferably from a Vertical Cavity Surface Emitting Laser (VCSEL), and still more preferably has a substantial Laguerre-Gaussian spatial energy distribution.

In the method a number of particles each in an associated microfluidic channel may each be illuminated in and by the laser light of an associated single Vertical Cavity Surface Emitting Lasers (VCSELs), all at the same time.

Alternatively, in the method multiple particles may be illuminated at multiple locations all within the same channel, and all at the same time.

The laser light illumination of the particle moving in the microfluidic channel under force of fluid flow is preferably substantially orthogonal to a local direction of the channel, and of the particle movement.

6. A Microfluidic Device

In still yet another of its aspects the present invention may be considered to be embodied in a microfluidic device for sorting a small particle within, and moving with, fluid flowing within microfluidic channels within the device.

The microfluidic device has a housing defining one or more microfluidic channels, in which channels fluid containing at least one small particle can flow, at least one microfluidic channel having at least one junction, said junction being a place where a small particle that is within a fluid flow proceeding from (i) a location within a microfluidic channel upstream of the junction, through (ii) the junction to (iii) a one of at least two different, alternative, microfluidic channels downstream of the junction, may be induced to enter into a selected one of the two downstream channels.

The device further has a flow inducer for inducing an upstream-to-downstream flow of fluid containing the at least one small particle in the microfluidic channels of the housing and through the junction.

Finally, the device has a source of optical, or photonic, forces for selectively producing photonic forces on the at least one small particle as it flows through the junction so as to controllably direct this at least one small particle that is within the fluid flow into a selected one of at the least two downstream microfluidic channels.

By this coaction the at least one small particle is transported from upstream to downstream in microfluidic channels by the flow of fluid within these channels, while the same small particle is sorted to a selected downstream microfluidic channel under a photonic force.

As before, a junction where sorting is realized may be in the topological shape of an inverted "Y" or, topologically equivalently, a "T", where a stem of the "Y", or of the "T", is the upstream microfluidic channel, and where two legs of the "Y", or, topologically equivalently, two segments of the crossbar of the "T", are two downstream microfluidic channels. Alternatively, a junction where sorting is realized may be in the shape of an "X", where two legs of the "X" are upstream microfluidic channels, and where a remaining two legs of the "X" are two downstream microfluidic channels.

In all configurations the photonic pressure force pushes the at least one small particle in a selected direction.

These and other aspects and attributes of the present invention will become increasingly clear upon reference to the following drawings and accompanying specification.

BRIEF DESCRIPTION OF THE DRAWINGS

Referring particularly to the drawings for the purpose of illustration only and not to limit the scope of the invention in any way, these illustrations follow.

DESCRIPTION OF THE PREFERRED EMBODIMENT

Figure 1:
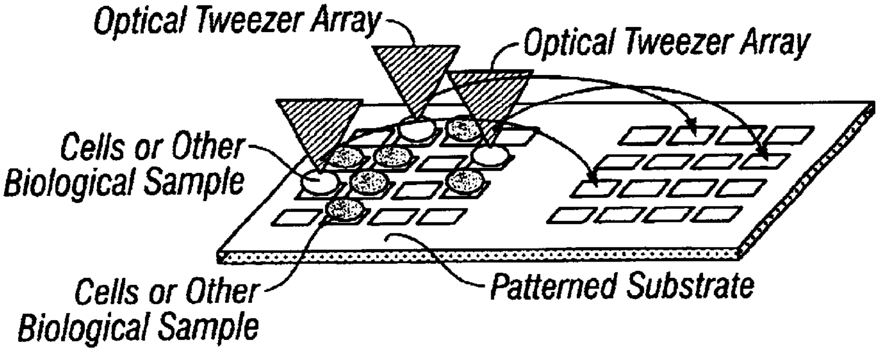
FIG. 1 is a diagrammatic representation showing VCSEL array optical tweezers in accordance with the present invention for the parallel transport of samples on a chip.

The following description is of the best mode presently contemplated for the carrying out of the invention. This description is made for the purpose of illustrating the general principles of the invention, and is not to be taken in a limiting sense. The scope of the invention is best determined by reference to the appended claims.

Although specific embodiments of the invention will now be described with reference to the drawings, it should be understood that such embodiments are by way of example only and are merely illustrative of but a small number of the many possible specific embodiments to which the principles of the invention may be applied. Various changes and modifications obvious to one skilled in the art to which the invention pertains are deemed to be within the spirit, scope and contemplation of the invention as further defined in the appended claims.

1. Theory of the Invention for All-Optical Switching of Biological Samples in a Microfluidic Device The present invention uses photonic pressure to implement directed switching and sorting of microparticles.

In its most basic and rudimentary form a photonic switching mechanism in accordance with the present invention uses an optical tweezers trap. Channels, most typically formed by molding a silicone elastomer, are used to guide a fluid, such as, by way of example, water, flowing, typically continuously, in a path having the shape of an inverted letter "Y" between, by way of example, one input reservoir and two output reservoirs. In accordance with the present invention, microspheres dispersed in the water continuously flowing through the input micro channel that forms the central leg of the "Y" are selectively directed by optical radiation pressure to a determined output channel, or a selected branch leg of the "Y". All-optical sorting is advantageous in that it can provide precise and individual manipulation of single cells or other biological samples regardless of their electrical charge or lack thereof.

Optical tweezers have been combined with microfabricated fluidic channels to demonstrate tile photonic sorter. In optical tweezers, the scattering of photons off of a small particle provides a net attractive or repulsive force depending on the index of refraction of the particle and the surrounding fluid. Previous demonstrations of the optical manipulation of objects through defined fluidic channels used photonic pressure to transport cells over the length of the channels. In contrast, the device described in this paper employs photonic pressure only at the switching junction, while long distance transport of the cells is achieved by continuous fluid flow. In the concept depicted in FIG. 1, cells or functionalized microspheres are entered into a T-shaped fluidic channel. It is desired that each sample should be sequentially identified (either by fluorescence or some other means) and then directed into one of the two branches of the "T" depending on its type. Sorting is achieved at the junction of the channel by capturing the sample in an optical trap and then drawing it to either the left or right side of the main channel. Provided that the fluidic flow is non-turbulent, when the sample is released it will naturally flow out the closest branch of the junction. The sorted samples may be collected or sent into further iterations of sorting.

Optical sorting in this manner may have a number of advantages over electrical sorting depending on the test and the type of cell. Some biological specimens—and the normal functions occurring within those specimens—may be sensitive to the high electric fields required by electrophoresis. In this case, photonic momentum transfer may be a less invasive process and can also be effective even when the charge of the sample is neutral or not known. Optical switching can provide precise, individual control over each particle. Additionally, while large arrays of sorting devices are envisioned on a single bio-chip to increase throughput, it may be difficult to address such large arrays electrically. Optical addressing may allow greater flexibility in this respect as device size scales.

2. Theory of the Present Invention for the Integration of Optoelectronic Array Devices for Cell Transport and Sorting In accordance with the present invention VCSEL arrays can serve as optical tweezer arrays. Tweezer arrays that are independently addressable can beneficially be used to both (i) transport and (ii) separate samples of microparticles, including in a bio-chip device integrating both the microchannels and the VCSEL arrays.

In accordance with the present invention, photonic momentum from the VCSEL laser light (from each of arrayed VCSELs) is used as to realize multiple parallel optical switches operating in parallel in multiple microfabricated microfluidic fluidic channels, and/or, in multiple locations in each microfluidic channel. Most typically everything—fluid flow, positional tweezing and translation of microparticles, sorting of microparticles, etc.—proceeds under computer control, permissively with parallelism between different "lines" as in an "on-chip chemical (micro-)factory", and with massive parallelism between same or similar lines running same or similar processes such as for analysis of proteins or the like such as in an "on-chip micro chemical reactor and product assessment system". Everything can transpire in a relatively well-ordered and controllably-sequenced matter because light—the controlling factor for all but fluid flow, and optically-controlled valves can control even that—is input remotely into the microfluidic structure, which is made on a substrate out of optically transparent materials. Non-contact of the switching and controlling devices—preferably a large number of VCSEL lasers—and the microfluidic channels and the fluid(s) and particle(s) flowing therein therefore simplifies fabrication of both the microfluidics and the controlling (VCSEL) lasers, and substantially eliminates cross-contamination.

It should be considered that this "control at a distance) (albeit, and as dimensions dictate, but a small distance), and via non-contaminating and non-interfering light to boot, is very unusual in chemical or biochemical processing, where within the prior art (other than for the limited functionality of prior art optical tweezers themselves) it has been manifestly necessary to "contact" the material, or bio-material, that is sought to be manipulated. The present invention must therefore be conceived as more than simply a device, and a method, for sorting microparticles but rather as a system for doing all aspects of chemistry and biochemistry at a distance, and remotely, and controllably—at micro scale! Something thus arises in the micro realm that is not possible in the macro realm.

3. Theory of the Present Invention for the Implementation of VCSEL Optical Tweezers, Including as are Implemented as Arrays In accordance with the present invention an optical tweezer may be implemented with one single vertical cavity surface emitting laser (VCSEL) device. An array of VCSELs may be used as a parallel array of optical tweezers that, as selectively controlled both individually and in concert, increase both the flexibility, and the parallelism, in the manipulation of microparticles.

The VCSELs are normally arrayed on a single chip, and, with their vertically-emitted laser beams, serve to manipulate microparticles on the surface of the chip, or on a facing chip including as may have and present channels, including channels as may also contain and/or flow fluids.

Although the most preferred VCSEL arrays are made from VCSELs modified (by a post-fabrication annealing process) to emit laser light most pronouncedly in a high-order Laguerre-Gaussian mode (as opposed to a Hermite-Gaussian mode), optical pressure forces from various still higher-power light sources can be used, particularly for the fast switching of particles within microfluidic channels.

In the most preferred implementation of arrayed optical tweezers each VCSEL in an array of VCSELs (i) emits in the Laguerre-Gaussian mode, (ii) with the emitted laser beam being focused, so as to individually act as a single trap. In this manner, precise uniformity or selective control over each trap can be achieved by appropriately modulating the current to each VCSEL. The VCSEL arrays are (i) compact (ii) reliable and long-lived, and (iii) inexpensive of construction on (iv) substrates that are compatible with other optoelectronic functions that may be desired in a bio-chip—such as arrayed detectors.

Both polystyrene microspheres and live cells both wet and dry are suitably tweezed and manipulated in diverse manners by both individual and arrayed VCSEL laser beams. For example, both (i) the attractive gradient force and (ii) the scattering force of a focused VCSEL optical beam have variously been used to direct, or to "switch", small particles flowing through junctions molded in PDMS.

The VCSEL based tweezers, and still other VCSEL arrays, of the present invention are suitably integrated as optical array devices performing, permissively simultaneously, both detection and manipulation. For example, one side of a transparent die defining and presenting microfluidic channels and switching junctions may be pressed flat against a combination stimulating and sensing chip that can, by way of example, both (i) stimulate the emission of, by way of example, fluorescent light from (only) those ones of suitably positioned sample particles or cells that appropriately emit such light as an indication of some characteristic or state, and, also, (ii) sense the fluorescent light so stimulated to be selectively emitted, including so as to ultimately provide an indicating signal to digital computer or the like. This (i) stimulating and (ii) sensing is done in one or more "upstream" locations, including in parallel.

The other side of the same transparent die having the microfluidic channels and switching junctions may be set flat against an array of VCSELs, each VCSEL "addressing" and associated switching junction most commonly downstream of some sensing location. As each particle moves by it may be selectively "switched" into one or another channel, including under computer control. In this manner highly parallel and cost effective cell analysis and sorting may he achieved.

4. Particular VCSEL Optical Tweezers in Accordance with the Present Invention

Optical tweezers and tweezer arrays have historically been generated in a number of ways including through the use of a rapid scan device, diffractive gratings or a spatial light modulator. Typical implementations of these techniques use the beam from a single high powered laser that is temporally or spatially divided among the various optical spots that are generated.

In implementation of optical tweezers and tweezer arrays in accordance with the present invention Vertical Cavity Surface Emitting Lasers (VCSELs) and VCSEL arrays are used where each VCSEL laser in the array is focused so as to individually act as trap See FIG. 1. In this manner, precise uniformity or selective control over each trap can be achieved by appropriately modulating the current to each VCSEL. VCSEL arrays provide a compact package, they are potentially very cheap, and the substrate is compatible with other optoelectronic functions that may be desired in a bio-chip such as array detectors.

Figure 2A:
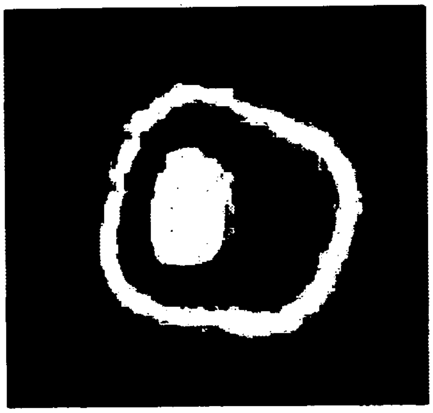
FIG. 2, consisting of FIGS. 2*a* and 2*b*, are pictures of the energy distribution of typical Hermite-Gaussian and Laguerre-Gaussian spatial energy distribution emission modes each from an associated VCSEL.
Figure 2B:
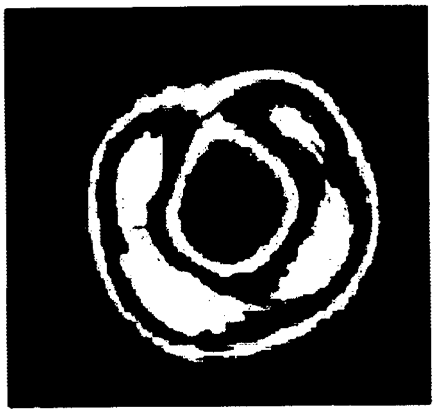
Figure 3A:
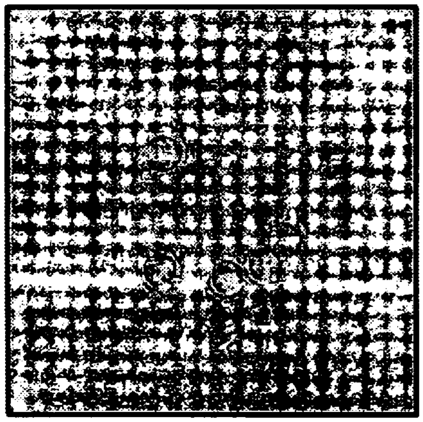
FIG. 3, consisting of FIGS. 3*a* through 3*d*, is a sequence of images showing the capture (1 and 2, FIGS. 3*a* and 3*b*), horizontal translation (3, FIG. 3*c*) and placement (4, FIG. 3*d*) of a 5 μm microsphere by a VCSEL-driven optical trap.
Figure 3B:
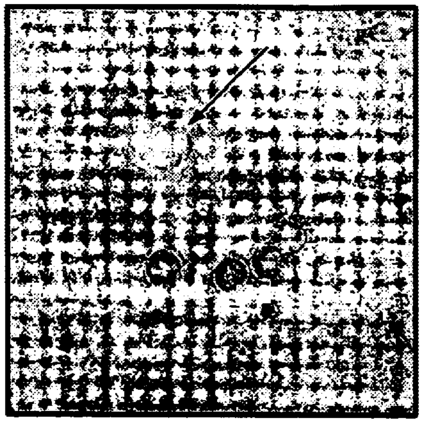
Figure 3C:
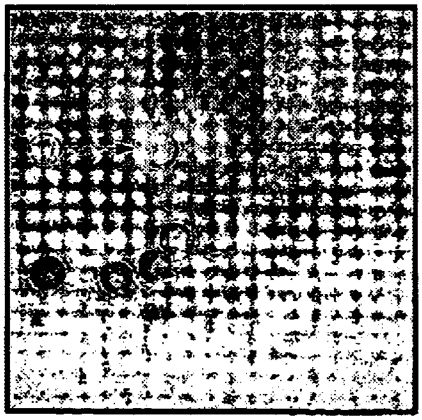
Figure 3D:
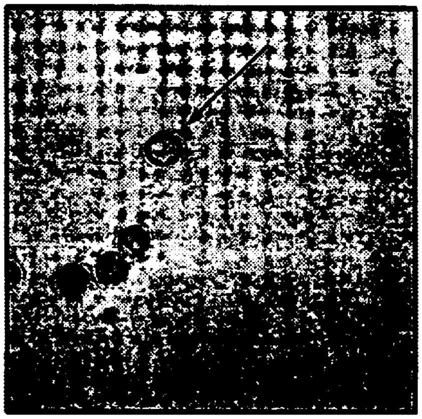
Figure 4A:
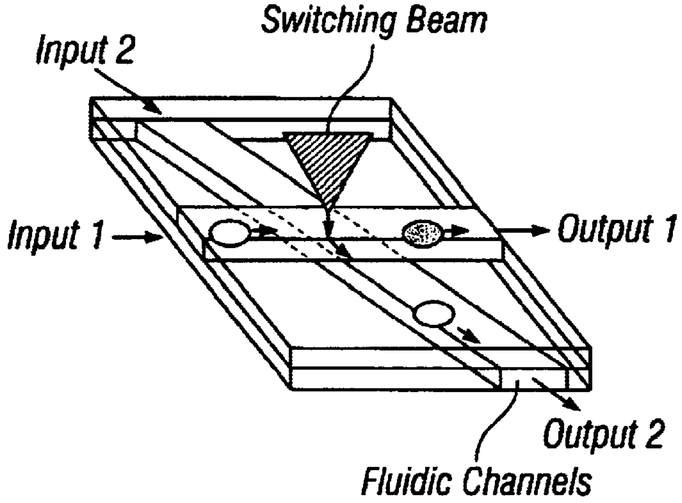
FIG. 4, consisting of FIGS. 4*a*–4*c*, is a diagram respectively showing in perspective view (FIG. 4*a*) and two side views with the optical beam respectively "off" (FIG. 4*b*) and "on" (FIG. 4*c*), the scattering force from an optical beam acting as an "elevator" between two fluidic channels at different levels in a three-dimensional PDMS structure; when the optical beam is "off" (FIG. 4*b*) a particle will flow straight through the junction; however when the optical beam is "on" (FIG. 4*c*), a particle will be pushed into the intersecting channel.
Figure 4B:
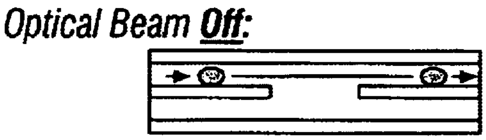
Figure 4C:
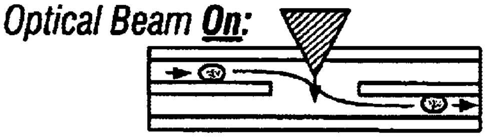
Figure 5A:
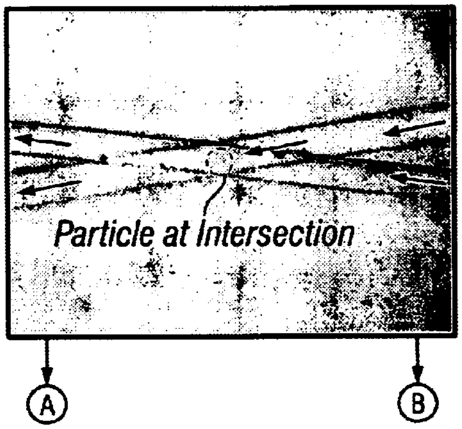
FIG. 5, consisting of FIGS. 5*a* through 5*c*, are diagrams of particle switching using optical scattering force; fluid is drawn through two overlapping channels at a constant rate; at the intersection of the two channels a 5 μm microsphere will either remain in the its original channel or be pushed by an incipient optical beam into the opposite channel.
Figure 5B:
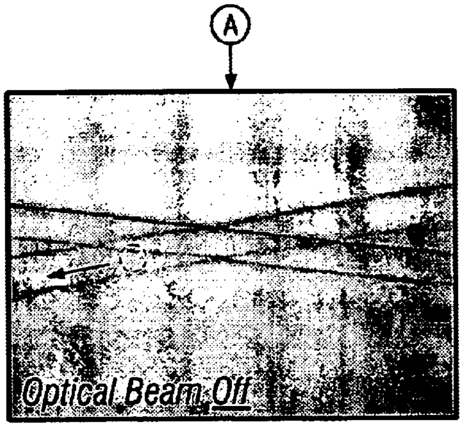
Figure 5C:
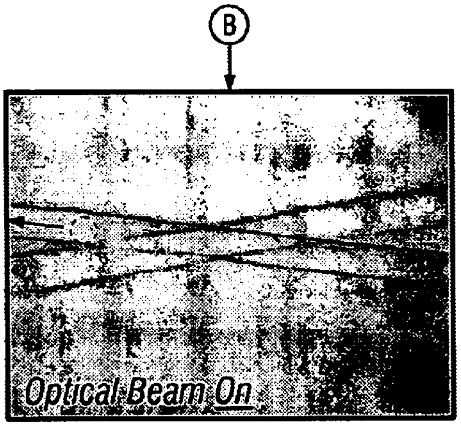
Figure 6:
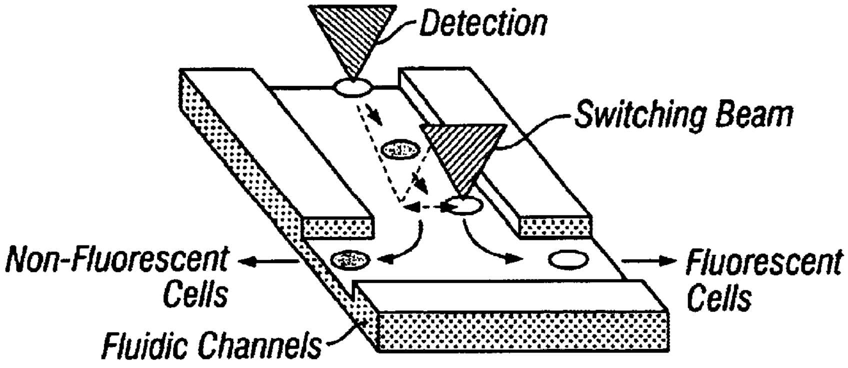
FIG. 6 is a diagrammatic illustration of the concept of the present invention for an all optical microfluidic flow cytometer for the separation of different cell species; samples are injected into the input port sequentially and directed to one of two output parts by the attractive trapping force of an optical tweezer beam.

The main drawback of VCSELs as optical tweezers is their relatively low output power, and therefore low trapping strength. In accordance with the present invention, this disadvantage is at least partially compensated by permanently changing the lasing mode of the VCSEL prior to use. The spatial emission mode of a packaged midsize proton-implant VCSEL is converted from a Hermite-Gaussian mode to a Laguerre-Gaussian mode through a simple past-fabrication annealing process. Laguerre modes are characterized by their rotational symmetry and in higher orders can very closely resemble the so-called "donut" mode. Shown in FIG. 2 is a comparison of the fundamental R Gaussian mode emitted from a VCSEL of FIG. 2*a* to the high-order LaGuerre mode of FIG. 2*b*. The energy of the emitted beam is moved to the outer edge of the u aperture where, in an optical trap, photons have the greatest axial restoring force. Energy has been removed from the center of the beam, thereby decreasing the detrimental scattering force that acts to push particles out of the trap.

Optical trapping of polystyrene microspheres dispersed in water has been successfully demonstrated using an 850 nm, 15 μm diameter aperture, LaGuerre mode VCSEL. A 100×, 1.5 N. A. microscope objective was used to focus the optical beam from the VCSEL onto a sample plate. FIG. 3 shows a sequence of images captured by a CCD camera in which a single 5 μm diameter microsphere has been trapped, horizontally translated, and released. The full three-dimensionality of the trap was verified by translating along all axes, and also by observing that when stationary Brownian motion alone was insufficient to remove the particle from the trap.

The strength of this trap was measured by translating the beads at increasingly higher speeds through water and observing the point at which fluidic drag exceeded the optical trapping force. For a 10 μm diameter microsphere and a VCSEL driving current of 18 mA, a maximum drag speed of 6.4 μm/sec was observed, corresponding to a lateral trapping force of 0.6 picoNewtons. Smaller live cells (<5 μm) obtained from a mouse were also shown to be trapped by the VCSEL tweezers. However the strength of the trap was considerably less due to the lower dielectric constant and irregular structure of cells.

The use of a VCSEL array in accordance with the present invention for the simultaneous transport of multiple particles, also in accordance with the present invention, has been demonstrated. Optical beams from three VCSELs in a 1×3 linear array were similarly focused as in FIG. 3 through a microscope objective to the sample plate. The device spacing on the optoelectronic chip was 250 um. After demagnification the trap spacing at the image plane was 13 um. Three 5 gm microspheres were captured and translated simultaneously. This small scale demonstration indicates that much larger two-dimensional tweezers arrays with VCSEL devices are possible.

Figure 7A:
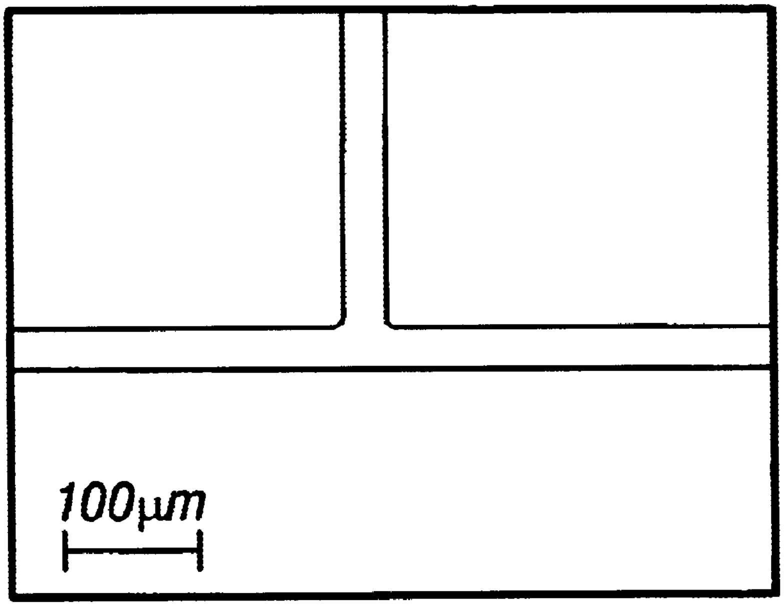
FIG. 7, consisting of FIGS. 7*a* through 7*d*, respectively show microfluidic "T", "Y", 1-to-N and M-to-N channels fabricated in PDMS in accordance with the present invention; a typical channel width being 40 μm.
Figure 7B:
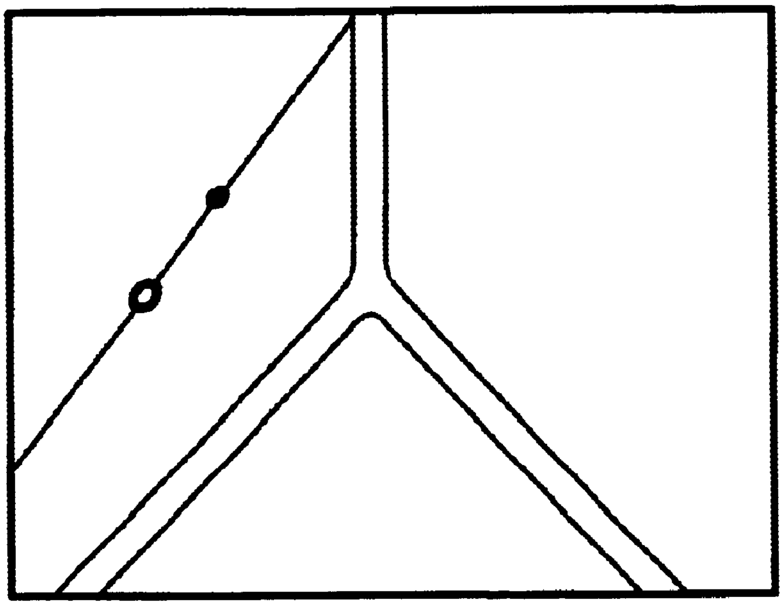
Figure 7C:
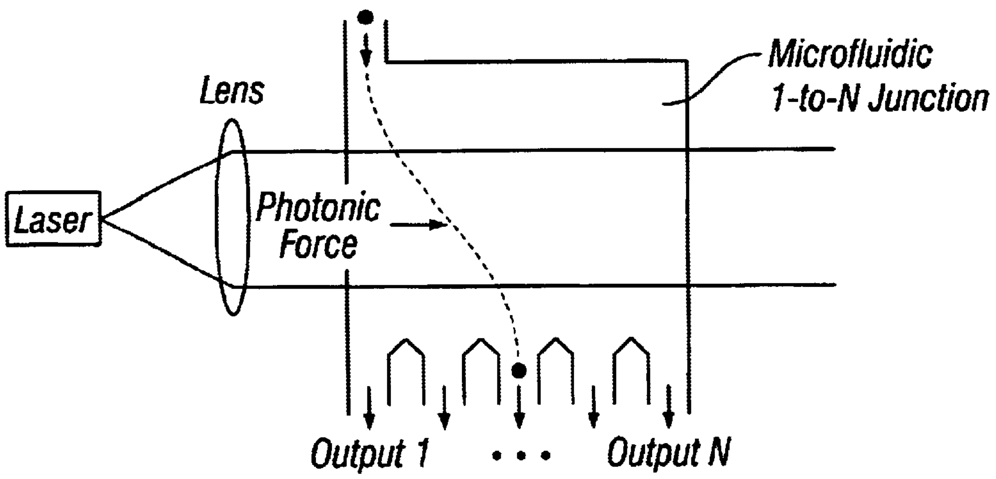
Figure 7D:
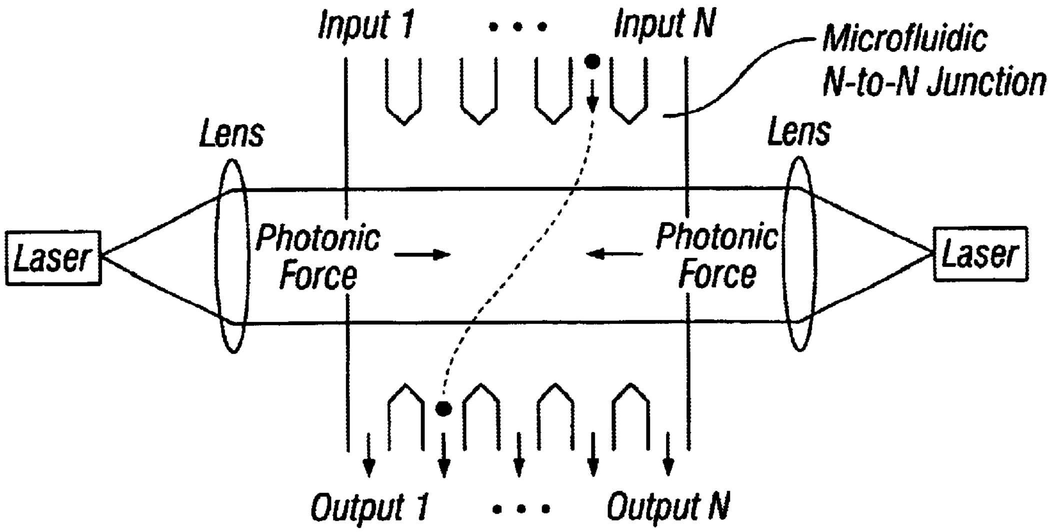

The feasibility of photonic particle switching in microfluidic channels has also been demonstrated. In initial experiments polystyrene beads were used to simulate the sorting of live cells. Microfluidic channels were fabricated in a PDMS-based silicone elastomer (Dow Corning Sylgard 184). The channels were molded by a lithographically-defined relief master. Samples were cured at room temperature over a period of 24 hours. After curing, the channels were treated in a 45 C 1-ICI bath (0. 02%, in water) for 40 minutes to increase their hydrophilicity. As shown in FIGS. 7*a* and 7*b*, both T-shaped and Y-shaped channels were fabricated. Similar results were obtained with each. Channels widths of 20 Am and 40 Am with depths ranging from 10 to20 Am and lengths from 2 to 4 mm were shown. To seal the channels the molded elastomer was capped by a microscope slide cover slip. Reservoirs at the end of each channel were left open to permit the injection of fluid. Additionally, a gold electrode was inserted into each reservoir to permit an electro-osmotic flow to be induced within the channels. A combination of electro-osmosis and pressure was used to draw the fluids down the main channel, while sorting was performed purely by photonic pressure. Electro-osmotic fluid flow is a convenient tool for microchannels of this size, however mechanical pumping can also be used. Microspheres ranging in diameter from 0.8 Um to 10 Am were dispersed in water and shown to flow through the channels.

Figure 8:
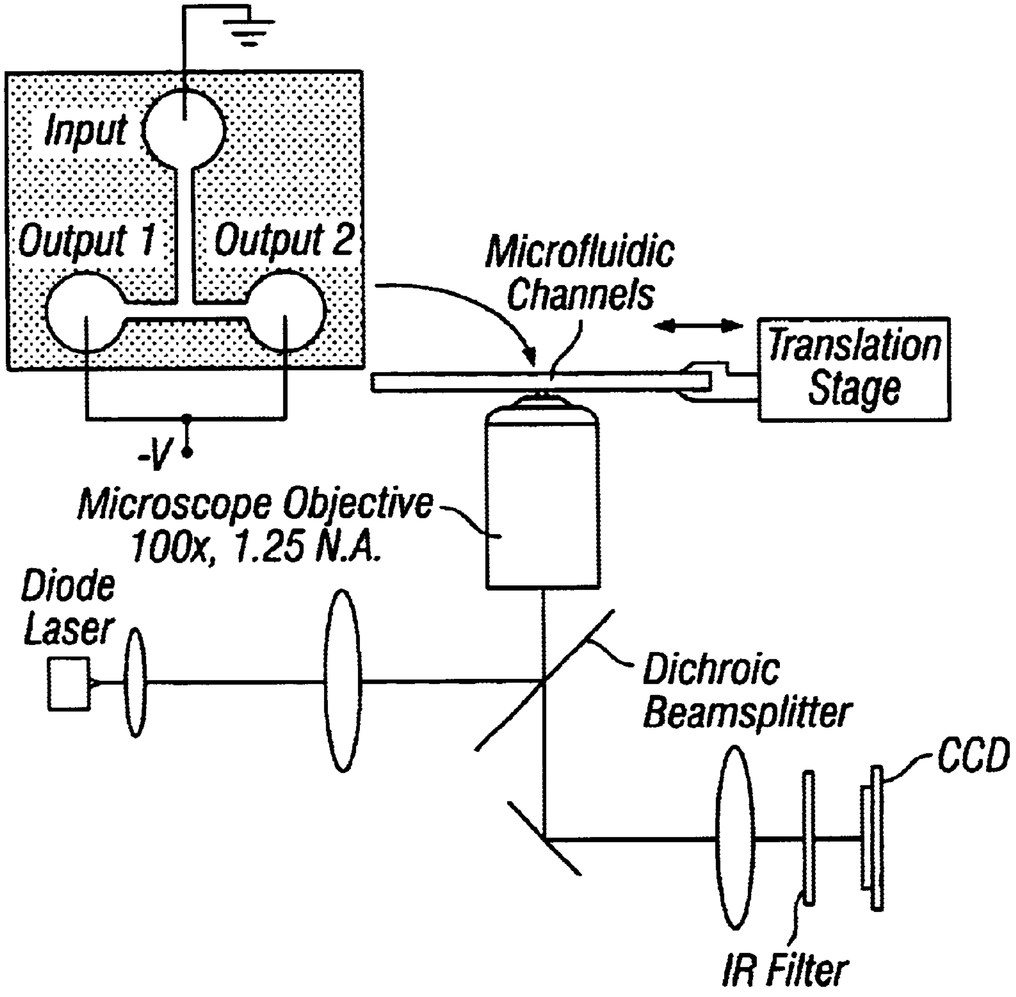
FIG. 8 shows a photonic sorting device in accordance with the present invention where (i) microfluidic channels are mounted into an optical tweezers and microscope setup; (ii) an optical beam is focused to a point at the junction of the channels; (iii) a voltage is applied to the channels to induce fluid flow; and (iv) sorting progress is monitored on a CCD camera.
Figure 9A:
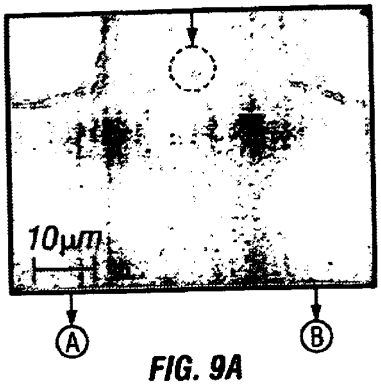
FIG. 9, consisting of FIGS. 9*a* through 9*e*, is a sequence of images demonstrating the photonic switching mechanism of the present invention where (i) microspheres flow in to a channel junction from an input port at the top; (ii) the microspheres are first captured (a) by an optical tweezer trap; (iii) the position of the microsphere is translated laterally to either the left or the right (B); and (iv) the microsphere is then released from the trap (C) and allowed to follow the fluid flow into either the left or right output parts. The dotted circle indicates the position of the optical trap. Where each of the two exit channels is equal, the microsphere will flow to its nearest exit channel (C).
Figure 9B:
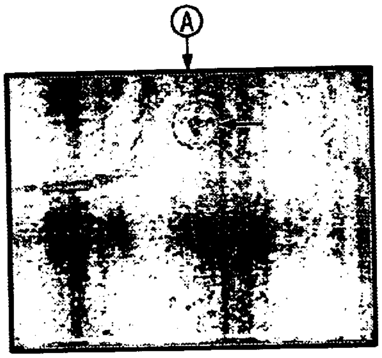
Figure 9D:
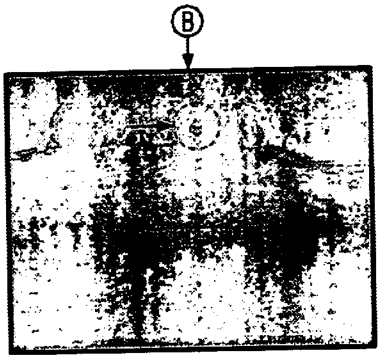
Figure 9C:
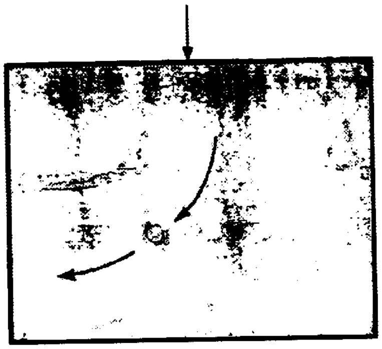
Figure 9E:
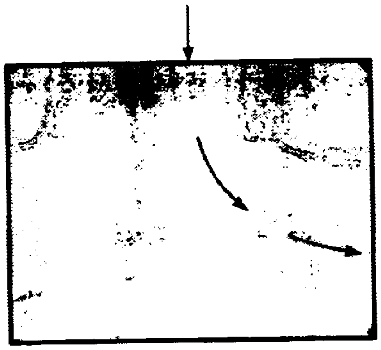

The setup for the optical sorter is shown in FIG. 8. The beam from a 70 mW, 850 mn diode laser is focused through the microscope slide cover slip onto the channels. The 100×, 1.25 numerical aperture microscope objective makes a highly focused spot, therefore allowing three-dimensional optical trapping. The position of the optical trap is moved by translating the mounted channels over the beam. Prior calibration of the optical trap strength at this power and for 5 $\mu$m diameter microspheres demonstrated a holding force of 2.8 picoNewtons. For this force the optical trap should be able to overcome the fluidic drag force of water for linear flow rates of up to 60 $\mu$m/sec.

A demonstration of the switching process is depicted in the sequence of images in FIGS. 9*a*–9*e*. The images shown here are magnified to the junction of the "T". The fluidic channels in this case were 40 $\mu$m wide and 20 $\mu$m deep. The optical trapping beam is not visible in these pictures due to the IR-blocking filter in front of the CCD camera. Microspheres with a diameter of 5 $\mu$m were drawn from the entry port with a linear fluidic velocity of approximately 30 $\mu$m/sec. The linear velocity is halved at the exit ports since each exit channel has the same cross-sectional area as the input channel. The potential difference between the entry and exit ports was 16 V.

It was determined that smaller objects were more easely trapped and transported. Larger objects feel a greater force due to the fluidic drag. Moreover, we have determined that live cells are also more difficult to manipulate in an optical trap due to their lower average index of refraction and irregular shape. Higher optical beam power levels are necessary to rapidly switch these types of particles.

Having shown the operation of the optical switching mechanism of the present invention, it is now explained how this may be integrated into a full sorting system including detection optics. Ideally, the trapping and translating motion should be automated, preferably by an actuating micromirror device or similar method. In addition, it should not be necessary to fully trap a sample, provided that sufficient momentum transfer can occur to displace the sample to one side. The laser power used in this application is high because the trapping force must overcome the drag force of the fluid. Implementing the optical trap from the top of the fluidic channels is inherently inefficient since most of the photonic momentum is directed downwards instead of sideways. In preferred implementations the laser beam is input from either side of the channel, either by focused beams or through integrated waveguides. By bringing the photons in from the sides of the channel, a much stronger "push" force can be achieved with much lower laser powers.

5. Conclusion

The present specification has shown and described an all-optical switching device for particles flowing through microfluidic channels, and methods of positionally translating, and switching, the particles. Important applications of such a device and such methods include sorting of cells and other biological samples both for biotech research as well as therapeutic medicine.

Photonic implementations of sample interrogation as well as manipulation have some advantages over purely electrical implementations, particularly in terms of reducing the chance of external influences. Preliminary viability tests performed on living fibroblast cells exposed to the optical trap beam showed that the cells continue to grow and reproduce normally. The use of vertical cavity surface emitting laser (VCSEL) arrays in multiple, independently-addressable optical traps is currently under active development. An integrated combination of both photonic and electronic devices should permit greater complexity and capability to be achieved in bio-chip technology.

In accordance with the preceding explanation, variations and adaptations of the optical tweezing and transporting and switching methods and devices in accordance with the present invention will suggest themselves to a practitioner of the optical design arts. For example, the VCSELs that preferably serve as optical tweezers can be arrayed in one, two and three dimensional arrays for controlling particulate movement and switching in one, two or three dimensions. The VCSELs can be, for example, colored—meaning centered upon a certain emission wavelength—as will make their radiation emission to act more, or less, strongly on various species, and states, of particles—thus potentially making that sensing can be dispensed with, and that switching will be both automatic and continuous dependent only upon particle coloration.

In accordance with these and other possible variations and adaptations of the present invention, the scope of the invention should be determined in accordance with the following claims, only, and not solely in accordance with that embodiment within which the invention has been taught.

What is claimed is:

1. A method of physically spatially switching a small particle to a selected one of plural alternative destination locations the method comprising:

suspending the particle in fluid flowing in a microfluidic channel from (i) an upstream location through (ii) a junction branching to (iii) each of plural branch channels leading to alternative downstream destination locations; and manipulating the particle under force of radiation as it moves in the microfluidic channel so as to move into a selected branch channel leading to a selected one of the plural alternative downstream destination locations.

2. The small particle switching method according to claim 1 wherein the manipulating is with a single radiation beam, the particle suspended within the flowing fluid passing straight through the junction into a path leading to a first downstream destination location in absence of the radiation beam but deflecting under radiation force in presence of the radiation beam into an alternative, second, downstream destination location.

3. The small particle switching method according to claim 2 wherein the manipulating is with a selected one of two radiation beams impinging on the junction from different directions, the particle suspended within the flowing fluid deflecting under radiation force of one radiation beam into a first path leading to a first downstream destination location while deflecting under radiation force of the other, different direction, radiation beam into a second path leading to a second downstream destination location.

4. The small particle switching method according to claim 1 wherein the manipulating is with a laser beam.

5. The small particle switching method according to claim 4 wherein the manipulating is with a Vertical Cavity Surface Emitting (VCSEL) laser beam.

6. The small particle switching method according to claim 4 wherein the manipulating is with a Vertical Cavity Surface Emitting (VCSEL) laser beam having Laguerre-Gaussian spatial energy distribution.

7. A switching mechanism for a small particle comprising:

a substrate in which is present at least one microfluidic channel proceeds from (i) an upstream location through (ii) at least one junction branching to (iii) each of plural downstream locations, the substrate being radiation transparent at the at least one junction;

flow means that induces in the microfluidic channel a flow of fluid bearing the small particle; and a module operable to produce at least one radiation beam which is selectively enabled to pass through the radiation-transparent junction region of the substrate and into the microfluidic channel so as to there selectively produce a radiation force on the small particle as it flows by sufficient so as to move the particle into a selected one of the plural downstream locations.

8. The switching mechanism according to claim wherein the substrate has plural levels differing in distance of separation from a major surface of the substrate, the at least one microfluidic channel branching at the at least one junction between at least (i) one, first, path continuing on the same level and (ii) another, alternative second, path continuing on a different level; and wherein one only radiation beam selectively acts on the small particle at the junction so as to (i) produce when ON a radiation force on the small particle at the junction that will cause the small particle to flow into the alternative second path, but which (ii) will when OFF permit the small particle to continue flowing upon the same level and into the first path.

9. The switching mechanism according to claim 7 wherein a selected one of two separately-directed radiation beams acts on the small particle at the junction so as to produce a directional radiation force on the small particle which force causes this small particle to flow into the selected one of the plural downstream locations.

10. The switching mechanism according to claim 7 wherein different microfluidic channels proceed through the at least one junction so as to collectively branch to each of m different downstream locations; wherein the small particle appearing at the junction in flow from any of the n different microfluidic channels is acted upon by the radiation beam so as to flow into a selected one of the m different downstream locations.

11. The switching mechanism according to claim 10 wherein two opposed radiation beams selectively pass through the radiation-transparent junction region of the substrate and into the microfluidic channel so as to there selectively produce a radiation force on the small particle as it flows by sufficient so as to move the particle into a selected one of the m different downstream locations.

12. A switch for controllably spatially moving and switching a small particle arising from a particle source into a selected one of a plurality of particle sinks, the switch comprising:

a radiation-transparent microfluidic device defining a branched microfluidic channel, in which channel fluid containing a small particle can flow, proceeds from (i) particle source to (ii) a junction where the channel then branches into (iii) a plurality of paths respectively leading to the plurality of particle sinks;

flow means to induce a flow of fluid, suitable to contain the small particle, in the microfluidic channel from the particle source through the junction to all the plurality of particle sinks; and a module to produce at least one radiation beam which is selectively enabled to pass through the radiation-transparent microfluidic device and into the junction so as to there produce a radiation force on a small particle as it passes through the junction within the flow of fluid, therein by this selectively enabled and produced radiation force selectively directing the small particle that is within the fluid flow into a selected one of the plurality of paths, and to a selected one of the plurality of particle sinks;

wherein the small particle is physically transported in the microfluidic channel from the particle source to that particular particle sink where it ultimately goes by action of the flow of fluid within the microfluidic channel; and wherein the small particle is physically switched to a selected one of the plurality of microfluidic channel paths, and to a selected one of the plurality of particle sinks, by action of radiation force from the radiation beam.

13. The small particle switch according to claim 12 wherein the branched microfluidic channel of the radiation-transparent microfluidic device is bifurcated at the junction into two paths respectively leading to two particle sinks;

wherein the flow means is inducing the flow of fluid suitable to contain the small particle from the particle source through the junction to both particle sinks; and wherein at least one radiation beam is selectively enabled to produce a radiation force on a small particle as it passes through the junction within the flow of fluid so as to selectively direct the small particle into a selected one of the two paths, and to a selected one of the two particle sinks.

14. The small particle switch according to claim 12 wherein two radiation beams are selectively enabled to produce a radiation force on a small particle as it passes through the junction within the flow of fluid so as to selectively direct the small particle into a selected one of the two paths, and to a selected one of the two particle sinks, one of the two radiation beams being enabled to push the particle into one of the two paths and the other of the two radiation beams being enabled to push the particle into the other one of the two paths.

15. The small particle switch according to claim 12 wherein the branched microfluidic channel of the radiation-transparent microfluidic device is bifurcated at the junction into two paths one of which paths proceeds straight ahead and another of which paths veers away, the two paths respectively leading to two particle sinks;

wherein one radiation beam is selectively enabled to produce a radiation force on a small particle as it passes through the junction within the flow of fluid so as to push when enabled the small particle into the path that veers away, and so as to permit when not enabled that the particle will proceed in the path straight ahead.

16. The small particle switch according to claim 12 wherein the bifurcated microfluidic channel of the radiation-transparent microfluidic device defines a geometric plane; and wherein the one radiation beam is substantially in the geometric plane at the junction.

17. A microfluidic device for sorting a small particle within, and moving with, fluid flowing within microfluidic channels within the device, the microfluidic device comprising:

a housing defining one or more microfluidic channels, in which channels fluid containing at least one small particle can flow, at least one microfluidic channel having at least one junction, said junction being a place where a small particle that is within a fluid flow proceeding from (i) a location within a microfluidic channel upstream of the junction, through (ii) the junction to (iii) a one of at least two different, alternative, microfluidic channels downstream of the junction, may be induced to enter into a selected one of the two downstream channels;

flow means for inducing an upstream-to-downstream flow of fluid containing the at least one small particle in the microfluidic channels of the housing and through the junction; and optical means for selectively producing photonic forces on the at least one small particle as it flows through the junction so as to controllably direct this at least one small particle that is within the fluid flow into a selected one of at the least two downstream microfluidic channels;

wherein the at least one small particle is transported from upstream to downstream in microfluidic channels by the flow of fluid within these channels; and wherein the at least one small particle is sorted to a selected downstream microfluidic channel under photonic force of the optical means.

18. The small particle microfluidic sorting device according to claim 17 wherein the junction is in the topological shape of an inverted "Y" or, topologically equivalently, a "T", where a stem of the "Y", or of the "T", is the upstream microfluidic channel, and where two legs of the "Y", or, topologically equivalently, two segments of the crossbar of the "T", are two downstream microfluidic channels.

19. The small particle microfluidic sorting device according to claim 17 wherein the junction is in the shape of an "X", where two legs of the "X" are upstream microfluidic channels, and where a remaining two legs of the "X" are two downstream microfluidic channels.

20. The small particle microfluidic sorting device according to claim 17 wherein the optical means produces photonic pressure force that pushes the at least one small particle in a selected direction.

21. The small particle microfluidic sorting device according to claim 17 wherein the optical means produces a radiation beam that enters the junction from a direction substantially orthogonal to the microfluidic flow paths at the junction.

22. The small particle microfluidic sorting device according to claim 17 wherein the optical means comprises:

a laser.

23. The small particle microfluidic sorting device according to claim 22 wherein the laser comprises:

a Vertical Cavity Surface Emitting Laser (VCSEL).

24. The small particle microfluidic sorting device according to claim 23 wherein the VCSEL produces a radiation beam that enters the junction from a direction substantially orthogonal to the microfluidic flow paths at the junction.

25. The small particle microfluidic sorting device according to claim 23 wherein the VCSEL produces a radiation beam that enters the junction from a direction substantially in a plane established by the microfluidic flow paths at the junction.

26. The small particle microfluidic sorting device according to claim 17 wherein the housing defines a plurality of microfluidic channels each with at least one junction;

and wherein the optical means comprises:

an array of laser light sources operable in parallel to each selectively illuminate an associated junction so as to selectively cause at the same time various small particles that are moving through various of the junctions to controllably enter into a selected one of at least two microfluidic channels downstream of each junction.

27. The small particle microfluidic sorting device according to claim 26 wherein the array of laser light sources comprises:

an array of Vertical Cavity Surface Emitting Lasers (VCSELs).

28. A method of sorting particles in a branched microfluidic channel comprising the steps of:

providing a device having a branched microfluidic channel, the branched microfluidic channel including a junction where a single microfluidic channel branches into a plurality of branch channels;

flowing fluid through the branched microfluidic channel, the fluid containing a plurality of particles; and irradiating a portion of the single microfluidic channel with a radiation beam, the radiation beam selectively directing the plurality of particles into the plurality of branch channels, wherein the radiation beam does not fully trap the plurality of particles.

29. The method of claim 28, further comprising the step of collecting the particles in at least one of the branch channels.

30. The method of claim 28, wherein two of the plurality of branch channels are respectively located in two different planes.

31. The method of claim 28, wherein the particles are cells.

32. A method of sorting particles in a three-dimensional microfiuidic device comprising the steps of:

providing a device having a first microfluidic channel and a second microfluidic channel, the first and second microfluidic channels oriented in an overlapping manner to form a junction at an intersection of the first and second microfiuidic channels;

flowing fluid through the first and second microfluidic channels, the first microfluidic channel including a plurality of particles within the fluid; and irradiating the junction with a radiation beam so as to transfer at least a portion of the particles from the first microfiuidic channel to the second microfluidic channel.

33. The method of claim 32, wherein the particles are cells.

34. A microfluidic sorting device for sorting particles comprising:

a substrate having a main microfluidic channel that branches into a plurality of microfluidic branch channels, the plurality of branch channels connecting to the main microfluidic channel at a junction;

flow means for inducing fluid flow in the main microfluidic channel and plurality of branch channels, the fluid flow in the main microfluidic channel containing the particles; and a radiation source to produce at least one radiation beam directed at a portion of the main microfuidic channel, the radiation beam selectively directing the particles into the plurality of microfluidic branch channels, wherein the radiation beam does not fully trap the plurality of particles.

35. The microfluidic sorting device of claim 34, wherein the particles are cells.

36. The microfluidic sorting device of claim 34, wherein the radiation source includes a laser and the radiation beam is a laser beam.

37. A device, comprising:

an input fluid channel to carry an input fluid flow having particles therein;

at least two output fluid channels coupled to the input fluid channel to form a junction to receive portions of the input fluid flow to produce two output fluid flows, respectively; and a module to produce an optical beam that illuminates a part of the fluid flow in the input fluid channel to optically push a particle from the particles in the input fluid flow into either one of the two output fluid flows in response to a control.

38. The device as in claim 37, further comprising a flow inducer to cause a fluid to flow from the input fluid channel to the two output fluid channels.

39. The device as in claim 37, wherein the optical beam is to optically exert a force on the particle without fully trapping the particle.

40. The device as in claim 37, wherein the input fluid channel is in a first plane and one of the two output fluid channels is in a second, different plane.

41. The device as in claim 37, wherein the module is configured to produce the optical beam in a first direction which optically pushes the particle into one of the two output channels, and wherein the module is further configured to produce a second optical beam in a second direction to optically push the particle into the other output fluid channel.

* * * * *